United States Patent
Sinclair et al.

(10) Patent No.: US 12,082,564 B2
(45) Date of Patent: Sep. 10, 2024

(54) SMART BUOYANCY IN AQUACULTURE

(71) Applicant: Marine Depth Control Engineering LLC, Boca Raton, FL (US)

(72) Inventors: Andrew Craig Sinclair, Southwater (GB); Christopher Charles Webb, Les Collons (CH)

(73) Assignee: Marine Depth Control Engineering LLC, Boca Raton, FL (US)

( * ) Notice: Subject to any disclaimer, the term of this patent is extended or adjusted under 35 U.S.C. 154(b) by 598 days.

(21) Appl. No.: 17/169,433

(22) Filed: Feb. 6, 2021

(65) Prior Publication Data
US 2021/0244005 A1 Aug. 12, 2021

Related U.S. Application Data

(60) Provisional application No. 62/971,816, filed on Feb. 7, 2020.

(51) Int. Cl.
| | | |
|---|---|---|
| A01K 61/60 | (2017.01) | |
| A01G 33/00 | (2006.01) | |
| A01K 61/10 | (2017.01) | |
| A01K 61/50 | (2017.01) | |
| A01K 61/54 | (2017.01) | |
| A01K 61/59 | (2017.01) | |

(Continued)

(52) U.S. Cl.
CPC ............. *A01K 61/60* (2017.01); *A01G 33/00* (2013.01); *A01K 61/10* (2017.01); *A01K 61/50* (2017.01); *A01K 61/54* (2017.01); *A01K 61/59* (2017.01); *B63B 35/44* (2013.01); *B63B 79/10* (2020.01); *B63B 79/40* (2020.01); *G05D 1/048* (2013.01)

(58) Field of Classification Search
CPC ........ A01K 61/60; A01K 61/10; A01K 61/50; A01K 61/54; A01K 61/59; A01K 69/08; A01G 33/00; B63B 35/44; B63B 79/10; B63B 79/40; G05D 1/048; Y02A 40/81

See application file for complete search history.

(56) References Cited

U.S. PATENT DOCUMENTS

2007/0231072 A1* 10/2007 Jennings ................. F03B 13/10
405/75
2012/0284165 A1* 11/2012 Morgenthaler ........... C02F 3/32
705/37

FOREIGN PATENT DOCUMENTS

JP 2011092182 A * 5/2011

OTHER PUBLICATIONS

English translation of JP 2011092182 A (Year: 2011).*

* cited by examiner

*Primary Examiner* — Shon G Foley
(74) *Attorney, Agent, or Firm* — Lee & Hayes, P.C.

(57) ABSTRACT

An aquaculture system can include an aquafarm with one or more aquatic pods of aquatic organisms and a remote device to manage the aquafarm. An aquatic pod may be associated with an aquatic structure with a buoyancy system and a control device to automatically perform daily farming functions. The aquatic structure may include an enclosure to hold the aquatic organisms. The control device may be configured to use a smart buoyancy assistant to control the buoyancy system and to determine the farming task to perform in response to environmental stimuli. The remote device can receive data representing crop metrics, harvest results, and sensor data. The remote device can aggregate data from multiple aquatic pods and correlate the data to generate aquaculture models to improve the harvest results. The remote device can generate overview and maintenance reports for the aquafarm.

20 Claims, 11 Drawing Sheets

(51) Int. Cl.
B63B 35/44 (2006.01)
B63B 79/10 (2020.01)
B63B 79/40 (2020.01)
G05D 1/00 (2006.01)

1100

```
┌─────────────────────────────────────────────────────────┐
│ RECEIVE INPUT DATA TO INITIATE AQUACULTURE FARMING,     │
│ WHEREIN THE INPUT DATA INCLUDES AT LEAST ONE OF A CROP  │
│ DATA OR AN AQUATIC STRUCTURE DATA                       │
│ 1102                                                    │
└─────────────────────────────────────────────────────────┘
                           ↓
┌─────────────────────────────────────────────────────────┐
│ DETERMINE TO MAINTAIN A HOVER FUNCTION AT A GROW DEPTH  │
│ 1104                                                    │
└─────────────────────────────────────────────────────────┘
                           ↓
┌─────────────────────────────────────────────────────────┐
│ DETERMINE, BASED AT LEAST IN PART ON ONE OR MORE        │
│ SENSORS, THAT AN ENVIRONMENT CONDITION MEETS OR EXCEEDS │
│ ONE OR MORE CROP RISK CONDITIONS                        │
│ 1106                                                    │
└─────────────────────────────────────────────────────────┘
                           ↓
┌─────────────────────────────────────────────────────────┐
│ DETERMINE TO DESCENT FROM THE GROW DEPTH TO A SAFETY    │
│ HOVER DEPTH BASED AT LEAST IN PART ON THE ENVIRONMENT   │
│ CONDITION                                               │
│ 1108                                                    │
└─────────────────────────────────────────────────────────┘
                           ↓
┌─────────────────────────────────────────────────────────┐
│ DETERMINE TO MAINTAIN THE HOVER FUNCTION AT THE SAFETY  │
│ HOVER DEPTH                                             │
│ 1110                                                    │
└─────────────────────────────────────────────────────────┘
                           ↓
┌─────────────────────────────────────────────────────────┐
│ DETERMINE TO RETURN TO THE GROW DEPTH AFTER A           │
│ PREDETERMINED TIME HAS ELAPSED                          │
│ 1112                                                    │
└─────────────────────────────────────────────────────────┘
                           ↓
┌─────────────────────────────────────────────────────────┐
│ DETERMINE, BASED AT LEAST IN PART ON TIME LAPSE, TO     │
│ TRANSMIT CROP REMOVAL NOTIFICATION FOR AT LEAST ONE OF  │
│ MAINTENANCE OR HARVEST                                  │
│ 1114                                                    │
└─────────────────────────────────────────────────────────┘
```

FIG. 11

SMART BUOYANCY IN AQUACULTURE

CROSS REFERENCE TO RELATED APPLICATION

This application claims the benefit of U.S. Provisional Patent Application No. 62/971,816, filed on Feb. 7, 2020, and is incorporated herein by reference in its entirety and for all purposes.

BACKGROUND

The United Nations' Food and Agricultural Organization estimates that more than one-half of the world's seafood consumption comes from aquaculture. Currently, the United States imports the vast majority of its seafood, much of which is produced in countries with fewer environmental regulations than American consumers and policymakers demand of domestically produced seafood. Even though the United States has the right to ocean farm in the Exclusive Economic Zone, which is the largest in the world, the requirements for sustainable fisheries have limited ability to expand to meet the increasing demand for seafood.

To maintain the current levels of seafood consumption, the United States must double aquaculture production by 2030. Accordingly, aquafarmers need to be able to substantially improve productivity and have reasonable access to cultivating marine livestock in our ocean waters.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 illustrates an example process for determining buoyancy control in performing aquaculture farming functions, as discussed herein.

DETAILED DESCRIPTION

Figure 1:
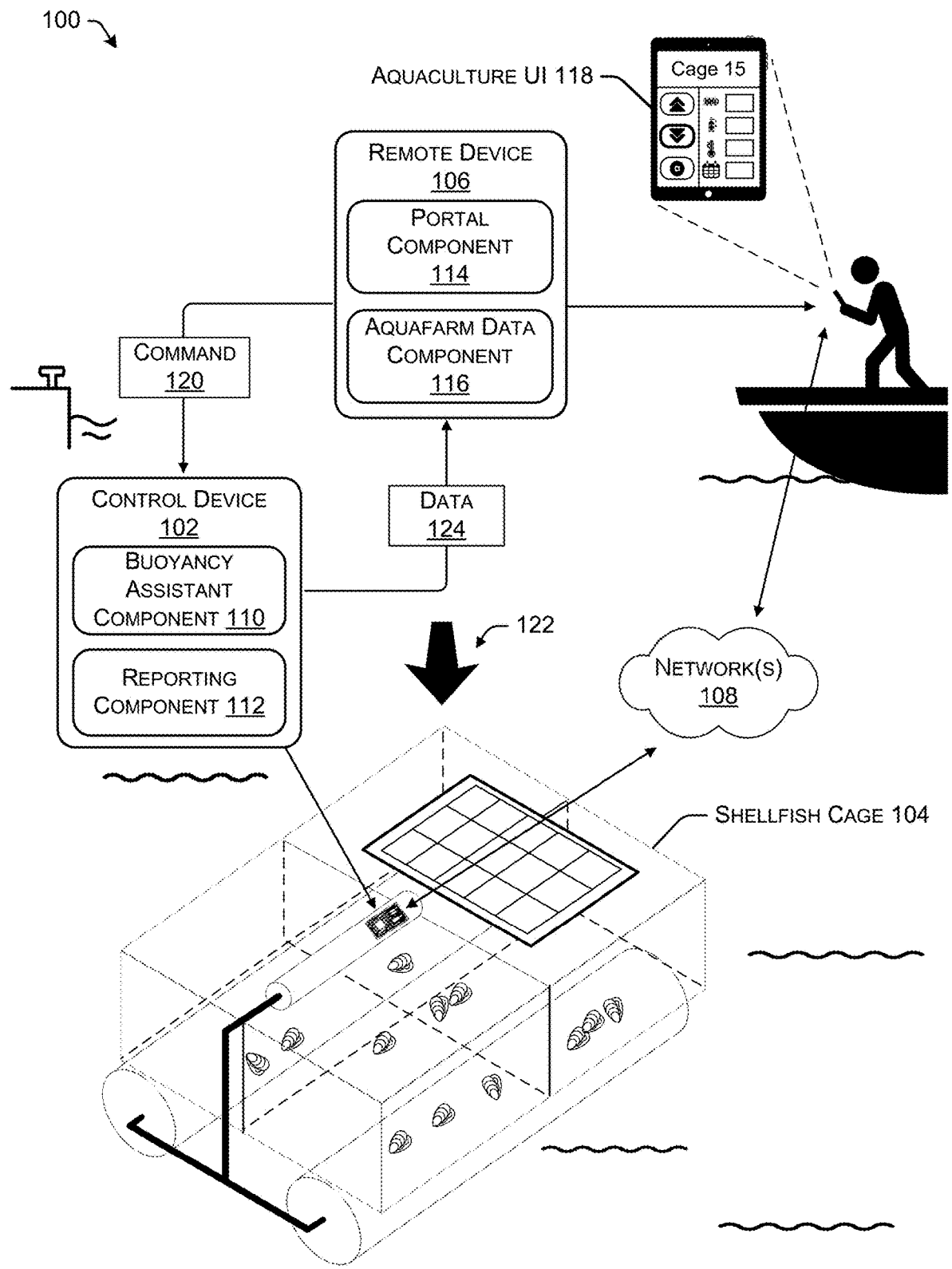
FIG. 1 illustrates an example system including a remote device and a control device configured to implement smart buoyancy components in aquaculture.

Systems, devices, and methods are directed to an aquaculture system that includes an aquatic structure with a control device configured to use a smart buoyancy assistant to move the aquatic structure to automatically perform farming tasks and cultivate aquatic organisms. The aquatic structure may include a buoyancy system and an enclosure structure to hold the aquatic organisms. The control device may "farm" by leveraging control on the buoyancy system to physically move the aquatic structure, and thus "herd" the aquatic organisms from a first location for feeding to a second location for cleaning. For instance, in oyster farming, the oysters may be optimally positioned near the water surface during feeding time to feed on the algae produced by the sun. Then, at least once a week, the oysters may be optimally positioned outside of the water during a desiccation time to "clean" the oysters by allowing the shells to dry and kill off any biofilm, barnacle, or algae.

In various examples, the buoyancy system may be configured with two or more buoyancy chambers. The control device controlling the buoyancy system with multiple buoyancy chambers may further leverage that control to perform additional farming tasks. For instance, in oyster farming, the oysters may be optimally agitated or tumbled to break the edges off the shells to create beautifully rounded shells to increase marketability. To perform an agitate task, the control device may alternate the airflow in and out of the different buoyancy chambers to cause the aquatic structure to rock from back and forth. In some examples, a rocking motion can be implemented in connection with an ascend or descend command to "rock" a structure while simultaneously traversing from one depth to another.

In some examples, a user ("farmer") may configure an aquafarm with an array of aquatic pods of aquatic organisms. The farmer may associate each aquatic pod with a pod identifier and an aquatic structure. The farmer may use a computing device ("remote device") to remotely control the control device. The remote device may establish a communication link with the control device and configure the control device to use a farming model for farming logic when determining which farming task to perform next. The farming task may include, but is not limited to, "herding" the pod to different locations for feeding, cleaning, shaking, maintaining, sheltering, or harvesting. The farming model may use signal data from one or more sensors when determining the farming task logic to optimize pod growth.

In some examples, the control device may receive input data or commands from the remote device. The commands may include a command to initiate farm mode for a particular crop type or a command to surface for maintenance. The input data may include triggers to initiate aquafarming and may include data to guide farming logic. The input data may set or modify one or more parameters for the farming model. For instance, a control device for a shellfish cage may receive parameters to set a frequency, duration, and/or starting time of desiccation for the cage. As described herein, desiccation is the process of lifting the shellfish cage out of the water to "clean" the cage and shellfish by allowing the cage and content to dry. The farming model may initialize a default desiccation frequency to once a week, and then the control device may receive input to change the frequency to biweekly. In various examples, the farming model may include logic to determine to initiate or end a desiccation process based on additional parameters, including but not limited to: stopping or avoiding desiccation if a surface temperature is above 100 degrees (or other temperature).

In various examples, the smart buoyancy assistant can be manually or automatically activated when the control device receives input to cause the aquatic structure to submerge. The control device may use the smart buoyancy assistant to control the buoyancy system to automatically perform buoyancy compensation functions for an aquatic structure based on a current farming task and one or more sensor data. The control device may automatically trigger a safety function to keep a pod from hazardous conditions. The hazardous conditions may include descending too fast, ascending too fast, extreme temperature, extreme weather, high ocean swells, and biofouling. The control device may receive input to initiate aquafarming functions, to perform a controlled ascent, and a level hold function at a predetermined feeding depth ("grow depth"). The level hold function allows an aquatic structure to remain at or near the predetermined feeding depth while underwater. The buoyancy system may use signal data from one or more sensors to determine whether to adjust an amount of air in a buoyancy chamber to "hover" at the predetermined feeding depth. To maintain a hover at the feeding depth, the system may adjust an amount of air in the buoyancy chamber to establish neutral buoyancy.

Once a level hold function is activated, the system may control an air valve and vent to automatically add or remove air, respectively, from the buoyancy chamber to perform the function. Because air is a critical consumable resource for buoyancy control, the system intelligently manages air consumption by adding or removing air as appropriate to maintain buoyancy control. Furthermore, the system may use one or more sensors to measure data for various factors (e.g., hovering depth, salinity of water, altitude of the body of water, etc.) that affects buoyancy control underwater.

The remote device may track data associated with the pods to continuously improve the farm model. In some examples, the remote device may associate an aquatic pod with a pod identifier, and data for the pod identifier may be tracked through the different life cycles of the pod until harvest. For instance, as the seedlings for an oyster pod matures, the oyster pod may be divided into multiple new pods to avoid overcrowding, and each newly-formed pod may be associated with a new pod identifier. In some examples, the remote device may configure a new control device for a new aquatic structure to use pod data from the original pod. For instance, a pod identified as "Pod A" may initially include 1,000 tiny oyster seedlings which were placed in an oyster cage with a mesh wall fine enough to contain the tiny seedlings. As the oysters mature, the growing oysters may be divided into multiple oyster cages with mesh walls that are less fine to allow algae to freely flow through the cage to optimize feeding and growth. In this example, Pod A may be distributed into Pod B, Pod C, and Pod D, where each pod contains 250 oysters and is associated with the same pod data up to this point.

The remote device can receive and store data representing crop metrics, harvest results, and sensor data for an aquafarm. As described herein, the remote device may collect feedback data for the system to improve and optimize the parameters for cultivating a healthy crop. The remote device can receive and aggregate data from multiple aquatic pods. The remote device can also use the aggregate data to generate overview reports for the aquafarm and determine a maintenance plan for specific aquatic pods and send a notification to a user with the maintenance plan. The remote device can correlate the aggregate data to generate farming models to improve the harvest results.

In various examples, the remote device may provide options to configure a control device to use different farming models to optimize different qualities. In some examples, when a pod is harvested, the remote device may ask the user to provide feedback to the system to rate one or more quality (e.g., size, taste, appearance, etc.) of the resulting crop. The pod data, including the harvest ratings, may be used as training data to generate optimal farming models to target different qualities. Thus, as the system receives feedback data, the system may improve and optimize the parameters for cultivating a healthy crop. For instance, the system may determine a first model that minimizes desiccation frequency and maximizes the time at a feeding depth is correlated with producing larger meaty oysters. Additionally, the system may determine a second model that increases the desiccation duration, and cage agitation is correlated with producing smaller oysters with beautiful shells. In the present example, the remote device may present suggestions to configure a control device to use the first model to produce a larger crop and the second model to produce a more attractive crop.

The systems, devices, and techniques described herein can improve the aquaculture systems by using smart buoyancy to control buoyancy for individual pods in an aquafarm, which removes the need for constant human intervention and reduces the labor cost. The present system allows fast implementation of a wide variety of changes to the parameters for determining farming logic for each pod in the aquafarm. Additionally, the systems, devices, and techniques discussed herein can improve the functions of aquaculture systems by capturing crop metrics and harvest results to identify parameters with a strong correlation with improving a particular quality of the crop. Moreover, by constantly monitoring crop metrics, the aquaculture system may learn how to configure a control device with a farm model optimized to produce certain results. By tuning the farming model, the aquaculture system may increase efficiency in meat production. These and other improvements to the functioning of an aquaculture system are discussed herein.

The systems, devices, and techniques described herein can be implemented in a number of ways. Example implementations are provided below with reference to the following figures. Although discussed in the context of oysters, mussels, or other aquatic life, the techniques discussed herein are not limited to these particular contexts and can be used in connection with other aquatic crops.

FIG. 1 illustrates an example system 100, including a remote device and a control device configured to implement smart buoyancy components in aquaculture, as described herein.

The control device 102 can communicatively connect with other devices, including other control devices and remote device 106, via the one or more network(s) 108. In an example, example system 100 shows the control device 102 can connect to the remote device 106, via the one or more network(s) 108, to engage in data transfers, and/or any other type of communication. The control device 102 can be configured to control buoyancy for an aquatic pod, including the shellfish cage 104.

In some examples, a control device 102 can include a buoyancy assistance component 110 and a reporting component 112. In general, the control device 102 can be a part of a buoyancy system, including buoyancy compensation chambers ("buoyancy chambers"), vent valves, and air valves. The control device 102 can receive sensor data from the aquaculture system and determine a farming task associated with the data. The sensor data may be received from one or more sensor that provides information on ambient conditions, including underwater depth, salinity, pressure, wave force, an altitude of the body of water, velocity, acceleration, or any parameter that may be needed as known to those skilled in the art to control buoyancy ascent, descent and the like.

The buoyancy assistance component 110 may determine to add or remove air from the buoyancy chamber. Additional details of the buoyancy assistance component 110 are discussed herein with respect to the buoyancy assistance component 206 of FIG. 2, below. To add or remove air, the buoyancy assistance component 110 may control one or more vent valves in various fashions, which may vary in duration. Generally, the one or more vent valves may be controlled to add air to the buoyancy chamber in quick bursts, via "puffs" (e.g., for a small amount of air compensation associated with a duration that is longer than a burst), or by holding the vent valve open for larger volumes of air. To add air, the buoyancy assistance component 110 may open an inflation inlet valve ("inflation valve") to add air into the buoyancy chamber. To remove air, the buoyancy chamber air controller may open an exhaust outlet valve ("exhaust valve") to release and/or purge air from the buoyancy chamber. Examples of aquatic structures, buoyancy compensation devices, and other techniques are discussed in U.S. patent application Ser. No. 17/145,106, filed Jan. 8, 2021. Application Ser. No. 17/145,106 is herein incorporated by reference, in its entirety, and for all purposes.

The buoyancy assistance component 110 may operate in different modes based on a current farming task. The buoyancy assistance component 110 may continuously monitor sensors during a controlled descent and may automatically trigger safety functions to correct dangerous conditions. These dangerous conditions include descending beyond a maximum depth, descending too fast, and ascending too fast. The farming functions may include a level hold for feeding, a controlled descent for sheltering, a controlled ascent for desiccation, maintenance, or harvest, and emergency ascent.

The buoyancy assistance component 110 may include operation modes that correspond to farming functions, including, but not limited to, level hold mode, controlled ascent mode, and/or controlled descent mode.

In a level hold mode, the buoyancy assistance component 110 may adjust the amount of air in the buoyancy chamber to hover at or near a predetermined depth level. To maintain a depth level at the predetermined depth, the buoyancy assistance component 110 adjusts the air in the buoyancy control equipment ("buoyancy equipment") to establish neutral buoyancy.

In a controlled ascent mode, the buoyancy assistance component 110 may adjust the amount of air in the buoyancy chamber to provide a controlled ascent rate at or slower than a maximum ascent speed. The buoyancy assistance component 110 may add small puffs of air in the buoyancy chamber to initiate an ascent at a controlled ascent rate. If the buoyancy assistance component 110 determines that the current ascent rate is at or exceeds the maximum ascent speed, the buoyancy assistance component 110 may open the exhaust vent valve to rapidly remove air from the buoyancy chamber.

In a controlled descent mode, the buoyancy assistance component 110 may adjust the amount of air in the buoyancy chamber to provide a controlled descent rate at or slower than a maximum descent speed. The controlled descent mode may be triggered by the control device 102 in response to a sensor detecting an extreme weather condition or turbulent water include temperature below a threshold or current above a threshold. For instance, the control device 102 may determine, based at least in part on one or more sensors, that an environment condition meets or exceeds one or more crop risk conditions. Additionally and/or alternatively, the control device 102 may determine the ambient temperature at a feeding depth that is too cold for the shellfish in the shellfish cage 104 and initiate the controlled descent mode to move the shellfish cage 104 to the seafloor for winterizing protection. In some examples, the controlled descent mode may be initiated by a user determining that the shellfish in the shellfish cage 104 is a bottom feeder. In some examples, the buoyancy assistance component 110 may automatically trigger a level hold function at the maximum depth to prevent accidental loss of crop from dropping the shellfish cage 104 past a maximum depth, which the system may not be able to recover from. If the buoyancy assistance component 110 determines that the current descent rate is at or exceeds the maximum descent speed, the buoyancy assistance component 110 may add small puffs of air in the buoyancy chamber to slow the descent rate. The controlled descent mode prevents unintended damage from the aquatic structure crashing hard onto a seafloor, which could damage the natural environment and sea life, the structure, or attached shellfish (e.g., mussels on a mussel rope).

In response to initiating aquafarming mode, the control device 102 can communicate with the remote device 106 via one or more network(s) 108. In some examples, the network(s) 108 may be any type of network known in the art, such as the Internet. Moreover, the remote device 106 and/or the control device 102 may be communicatively coupled to the network(s) 108 in any manner, such as by a wired or wireless connection. In some examples, the remote device 106 and/or the control device 102 may initiate establishing a communication link. The communication link may include any wired linked or wireless link. The wireless link may include any acoustic link and/or electromagnetic field link and/or radio frequency. In at least one configuration, the remote device 106 may include any components that may be used to facilitate interaction between the control device 102. For example, the remote device 106 may include a portal component 114 and an aquafarm data component 116.

The aquafarm data component 116 may collect farm metrics from the control device 102. In some examples, the farm metrics may include the data for farming functions performed and/or sensor data collected over. In various examples, the aquafarm data component 116 may collect farm metrics (e.g., crop data 124) from multiple control devices associated with multiple aquatic pods and aggregate data for training models. The aquafarm data component 116 may also collect sensor data to improve the diving algorithm. The sensor data may be received from a plurality of sensors that provide information on ambient conditions, including underwater depth, salinity, pressure, wave force, an altitude of the body of water, velocity, acceleration, or any parameter that may be needed as known to those skilled in the art to control buoyancy ascent, descent and the like.

Examples of the remote device 106 can include but are not limited to, portable computers, laptop computers, servers, electronic book devices, or any other portable electronic devices that can generate, request, receive, transmit, or exchange data over a network. The remote device 106 may be implemented in a non-distributed computing environment or may be implemented in a distributed computing environment, possibly by running one or more modules on remote device 106 or other remotely located devices. The remote device 106 may be any type of server, such as a network-accessible server. A user may operate the remote device 106 using any input/output devices, including but not limited to mouse, monitors, displays, augmented glasses, key board, cameras, microphones, speakers, and headsets.

In some instances, the remote device 106 can communicate with any number of control devices, other remote devices, servers, computing devices, and the like.

As a non-limiting example, the example aquaculture system 100 can illustrate an instance of a user using the remote device 106 to communicate with the control device 102 of the shellfish cage 104 to initiate aquafarming functions. The user provides input, via an example aquaculture user interface (UI) 118, at the remote device 106 to the transmits an example aquafarming command 120 to the control device 102.

The control device 102 receives the example aquafarming command 120 to descend to a seafloor for feeding. The buoyancy assistant component 110 activates a controlled descent mode, and the shellfish cage 104 begins the example decent 122 toward the seafloor.

While the shellfish cage 104 is descending to the seafloor to feed, the reporting component 112 transmits example data 124 to the remote device 106 to report on the environmental conditions around the shellfish cage 104 based on received sensor data. The aquafarm data component 116 may store the example data 124 to be used as training data to continuously improve the farming models.

Figure 2:
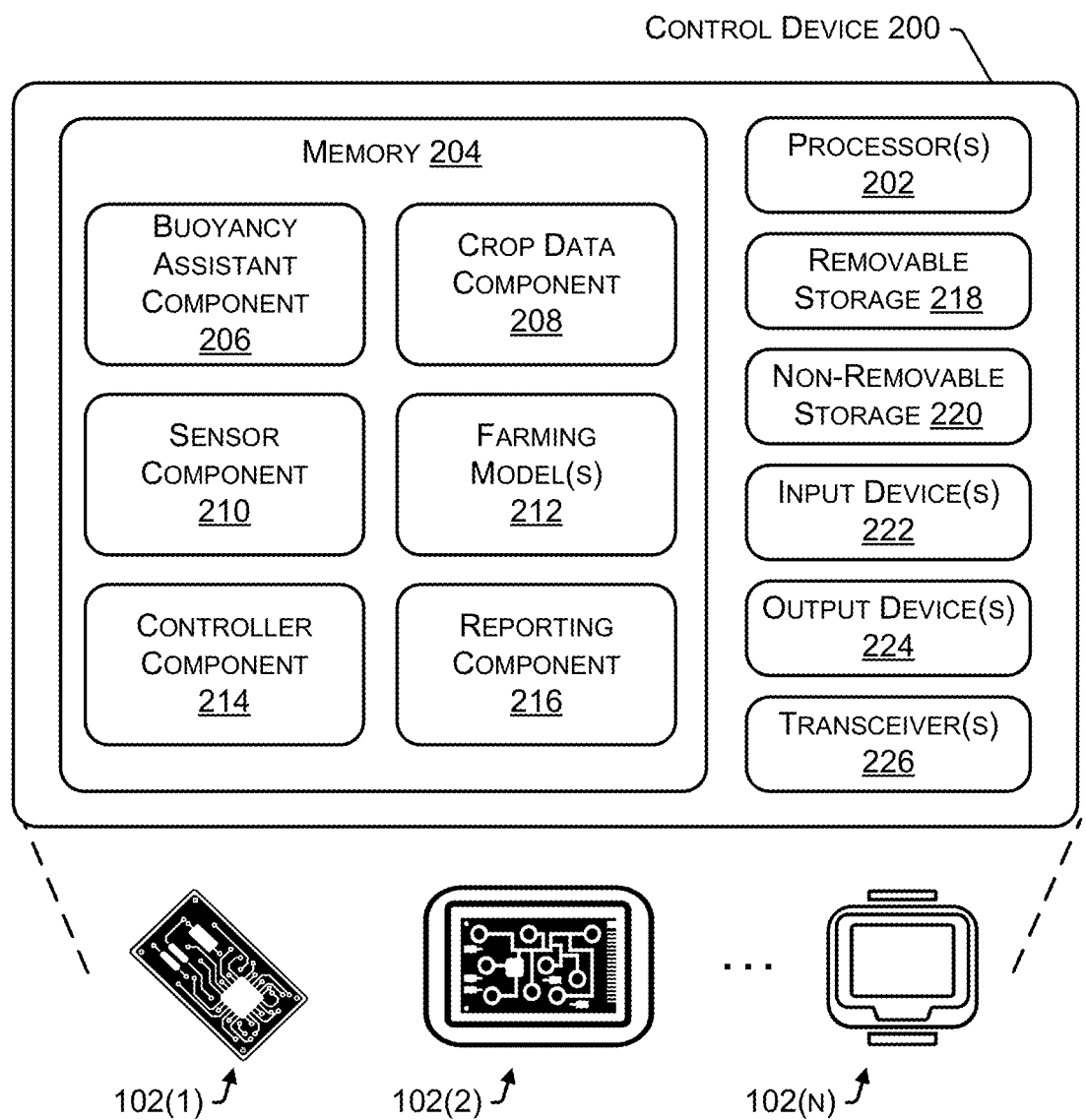
FIG. 2 illustrates an example control device configured to implement the smart buoyancy components in aquaculture, in accordance with embodiments of the disclosure.

FIG. 2 illustrates an example control device 200 configured to implement the smart buoyancy components in aquaculture, in accordance with embodiments of the disclosure. In some embodiments, the control device 200 can correspond to the control device 102 of FIG. 1. It is to be understood in the context of this disclosure that the control device 200 can be implemented as a single device or as a plurality of devices with components and data distributed among them. By way of example, and without limitation, the control device 200 can be implemented as various control devices 102(1), 102(2), . . . , 102(N).

As illustrated, the control device 200 comprises a memory 204 storing a buoyancy assistance component 206, a crop data component 208, a sensor component 210, a farming model(s) 212, a controller component 214, and a reporting component 216. Also, the control device 200 includes processor(s) 202, a removable storage 218 and non-removable storage 220, input device(s) 222, output device(s) 224, and transceiver(s) 226.

In various embodiments, memory 204 is volatile (such as RAM), non-volatile (such as ROM, flash memory, etc.) or some combination of the two. The buoyancy assistance component 206, the crop data component 208, the sensor component 210, the farming model(s) 212, the controller component 214, and the reporting component 216 stored in the memory 204 can comprise methods, threads, processes, applications or any other sort of executable instructions. The buoyancy assistance component 206, the crop data component 208, the sensor component 210, the farming model(s) 212, the controller component 214, and the reporting component 216 can also include files and databases.

The buoyancy assistance component 206 can include functionality to maintain buoyancy control of the aquatic pod and/or aquatic structure while submerged, as discussed herein. The buoyancy assistance component 206 may store information in relation to the associated aquatic structure, including enclosure types. The buoyancy assistance component 206 may store information for the buoyancy system include buoyancy chamber count and the ability to support the weight of the structure and the pod. In some examples, the buoyancy assistance component 206 can determine if the buoyancy system includes an emergency recovery system to trigger automatic inflation of the buoyancy chambers when a primary air source fails.

The buoyancy assistance component 206 can include functionality to determine one or more metrics associated with a sensor data received, detected, or otherwise monitored by the control device 200. For example, the buoyancy assistance component 206 can determine metrics including but not limited to the current depth, descent speed, ascent speed, air remaining, and the like. For instance, the buoyancy assistance component 206 can receive sensor data from a water pressure sensor to determine the current depth and an air pressure sensor to determine the percentage of air left in the air cylinder. The buoyancy assistance component 206 can send the metrics to a remote device to aggregate and analyze the metrics.

In some examples, the buoyancy assistance component 206 may determine to add or remove air from a buoyancy control system (buoyancy chamber). To add air, the buoyancy assistance component 206 may interact with the controller component 214 to control one or more vent valves in quick bursts or "puffs" (e.g., 0.5 seconds, 0.2 seconds, etc.), to imitate the quick actuation of buttons like a diver would perform, for a small amount of air compensation. The controller component 214 may also hold the vent valve open for a large amount of air compensation. The buoyancy assistance component 206 may include a diving algorithm to determine the amount of air compensation needed. In various examples, the buoyancy assistance component 206 may determine the amount of air compensation needed relative to a current depth because air is more compressed at a deeper level than closer to the surface based on pressure. The buoyancy assistance component 206 may perform different functions based on different operation modes, and the air compensation may depend on the operation modes. The operation modes may include descent, level hold, ascent, agitate, or roll, as described herein.

In various examples, the buoyancy assistance component 206 may include safety functions that are always on while submerged, including maintaining maximum dive depth, maximum ascent speed, and maximum descent speed. For instance, in response to falling below the maximum dive depth setting, the buoyancy assistance component 206 can activate level hold mode to add air to the buoyancy chamber and bring the hover level back to maximum dive depth. If the current rate of descent is at speed higher than the maximum descent speed setting, the buoyancy assistance component 206 can activate descent mode to add air to the buoyancy chamber to slow the descent. If the current rate of ascent is at speed higher than the maximum ascent speed setting, the buoyancy assistance component 206 can activate ascent mode to remove air from the buoyancy chamber to slow the ascent.

In a controlled descent mode, the buoyancy assistance component 206 may adjust the amount of air in the buoyancy chamber to provide a controlled descent rate at or slower than a maximum descent speed. The controlled descent mode may be triggered by the control device 200 in response to a sensor detecting an extreme weather condition or turbulent water include temperature below a threshold or current above a threshold. For instance, the control device 200 may determine, based at least in part on one or more sensors, that an environment condition meets or exceeds one or more crop risk conditions. Additionally and/or alternatively, the control device 200 may determine the ambient temperature at a feeding depth that is too cold for the shellfish in the shellfish cage and initiate the controlled descent mode to move the shellfish cage to the seafloor for winterizing protection. The buoyancy assistance component 206 may determine to descent from the grow depth to a safety hover depth based at least in part on the environment condition. In response to extreme weather, the safety hover depth may be at or near the seafloor for a cage type, but a mussel rope or similar may be set at the seafloor minus the length of the rope. The control device 200 may determining to return to the grow depth after a predetermine time has lapsed, but the control device 200 may continue to monitor whether the environment condition that meets or exceeds the one or more crop risk conditions remains. If the environment condition did not improve, the buoyancy assistance component 206 may determine to descent back to the safety hover depth again.

In an example, in level hold mode, the buoyancy assistance component 206 may adjust the amount of air in the buoyancy chamber to hover at the predetermine depth level. To "hover" or maintain the level at the predetermined depth, the buoyancy assistance component 206 can adjust the air in the buoyancy chamber to establish neutral buoyancy. The level hold mode may be activated by a user from a remote device based on transmitting a command to go to a predetermined depth level and initiate aquafarming functions. In relationship to aquafarming, activating a level hold mode is used to command the aquatic pod to "feed at the predetermined depth level."

Once level hold mode is activated, the buoyancy assistance component 206 may determine to add or remove air from the buoyancy system to perform the level hold function.

In some instances, the buoyancy assistance component 206 can include functionality to receive commands with an indication from a user to enable or disable different operation modes and/or functions of the buoyancy assistance component 206. For example, in some instances, a user of a remote device (e.g., remote device 300) can send a deactivate the level hold command based on selecting an up or down command. Then, the user may wish to set hover at current depth by activating a stop command and the like. In additional examples, the buoyancy assistance component 206 can continuously monitor sensor data and generate alerts to present to the user via a user interface on a user device. For instance, if the buoyancy assistance component 206 detects one or more unsafe condition based on meeting one or more criteria, including diving beyond maximum depth, ascending too quickly, low air level, failing safety stop, or descending too quickly, the buoyancy assistance component 206 may generate an alert indicating the unsafe condition.

In some examples, the buoyancy assistance component 206 may operate in desiccation mode. The control device 200 may receive parameters to set a frequency, duration, and/or starting time of desiccation. The control device 200 may maintain timers for to trigger different farming task for may determine a timer based on time lapse. The control device 200 may determine a desiccation timer exceeds wait time. The control device 200 may determine to extend a wait time based on surface condition. The buoyancy assistance component 206 may determine to perform a desiccation function based at least in part on the timer. The farming model may initialize a default desiccation frequency to once a week, then the control device may receive input to change the frequency to biweekly. In various examples, the farming model may include logic to determine to initiate or end a desiccation process based on additional parameters, including but not limited to: stopping or avoiding desiccation if a surface temperature is above 100 degrees. The buoyancy assistance component 206 may perform a controlled ascent at the predetermined starting time. The buoyancy assistance component 206 may add more air to the buoyancy chamber, at or near the water surface, to lift a cage or structure out of the waters. The buoyancy assistance component 206 may determine whether a timer meets or exceeds a predetermined desiccation time interval at or near the surface. The buoyancy assistance component 206 may determine to perform a desiccation function based at least in part on the timer. The buoyancy assistance component 206 may determine desiccation function is complete and reset desiccation timer. After the desiccation mode and/or the desiccation function is complete, the buoyancy assistance component 206 may determine to return to hover function at the grow depth or feeding depth.

In some examples, the buoyancy assistance component 206 may coordinate the air and/or water flow in and out of each buoyancy chamber to operate in agitate mode and/or roll mode. The buoyancy assistance component 206 may perform an agitation function based on cage type. In some examples, the buoyancy assistance component 206 may pause at a predetermined pause depth (e.g., 10 ft, 15 ft, etc.) to initiate any agitate function. The predetermined pause depth may include a minimum pause depth and further be based on the cage type due to a size, width (e.g., large oyster cage needs to be submerged at least width deep for flipping), length, or capability issue (e.g., mussel raft should not flip). The minimum pause depth allows for greater buoyancy control due to the first 15 feet (3 meters) below surface having a steep chain in air pressure. The agitation function includes the agitate mode and the roll mode and are triggered to imitate a tumbling and/or shaking the oysters to break the edges off the shells leading to a more marketable shape. The buoyancy assistance component 206 performs the agitate motion by alternating an increase and decrease of the amount of air in two or more buoyancy chambers. The buoyancy assistance component 206 may determine if the buoyancy system is able to support a roll function based on whether the current configuration includes a double buoyancy configuration. To perform a roll function, the buoyancy assistance component 206 may increase and decrease the air in three or more buoyancy chambers. A visual illustration of the roll function is included in FIG. 6. After the agitation function is complete, the buoyancy assistance component 206 may determine to return to the hover function at the grow depth and/or feeding depth.

In additional examples, the buoyancy assistance component 206 can continuously monitor sensor data and generate alerts to present to the user via a user interface on a remote device. For instance, if the buoyancy assistance component 206 detects one or more unsafe conditions based on meeting one or more criteria, including low air, low battery, or activating an emergency buoyancy system, the buoyancy assistance component 206 may generate an alert indicating maintenance is needed for the present aquatic pod.

In some instances, the buoyancy assistance component 206 can correspond to the buoyancy assistance component 110 of FIG. 1.

The crop data component 208 can include functionality to receive input from a user to set or modify one or more parameters for the farming model used to determine the farming task logic. For instance, a control device for an oyster cage may receive parameters to set a frequency, duration, and/or starting time of desiccation for the cage. As described herein, desiccation is the process of lifting an oyster cage out of the water to "clean" the cage and allowing any biofilm formed on the oysters to dry out. The system may determine to initialize a default desiccation frequency to once a week, and the crop data component 208 may receive input to set the frequency to biweekly. The control device 200 may determine to initiate or end a desiccation process based on additional parameters, including but not limited to: stopping or avoiding desiccation if a surface temperature is above 100 degrees and initiating desiccation if salinity falls below 2 ppm. The crop data component 208 may determine whether a timer meets or exceeds a predetermined desiccation time interval. In some examples, the crop data component 208 may maintain a count on the frequency and duration of various farming tasks, including but not limited to, a count of completed desiccation functions, total frequency and duration in agitation and/or roll functions, a total duration of time at feeding depth, and the like. The crop data component 208 may store this data for model training purposes.

In some instances, the crop data component 208 may provide farming logic data that include parameters to the buoyancy assistance component 206. For instance, to perform the desiccation function, the buoyancy assistance component 206 may trigger a controlled ascent mode.

In various examples, the crop data component 208 for a newly configured control device 200 can receive and store crop data based on a pod dividing to avoid overcrowding. The crop data component 208 may append newly generated crop data and/or farm metrics to the received crop data. Additionally, the crop data component 208 may determine the crop age from the received crop data rather than "0 days" for a new crop.

The sensor component 210 can include functionality to receive and process sensor data from one or more sensors (e.g., a barometer, a water pressure sensor, a temperature sensor, a salinity sensor, an air pressure sensor (e.g., of an air supply), timer, accelerometer, GPS, etc.), as discussed herein. The sensor data may be received from one or more sensor that provides information on ambient conditions, including underwater depth, salinity, pressure, wave force, an altitude of the body of water, velocity, acceleration, or any parameter that may be needed as known to those skilled in the art to control buoyancy ascent, descent and the like. In some instances, the sensor component 210 can use one or more sensors to measure data for various factors (e.g., salinity of water, altitude of the body of water, air remaining in air cylinder, etc.) that affects buoyancy control underwater. In various examples, the sensor component 210 can include functionality to present processed sensor data on a user interface on the remote device 300, for example, to indicate farm metrics including current depth, air remaining in air cylinder, current ascent/descent rate, total submerged time, surface time, current time, and temperature.

In some instances, the sensor component 210 can take priority over a current farming task of the control device 200 to protect the crop. For example, if the buoyancy assistance component 206 is on level holding at a feeding depth and if the sensor component 210 subsequently determines that the current temperature is below a threshold temperature, in some instances, the sensor component 210 can activate a controlled descent mode on the buoyancy assistance component 206. In an additional example, the sensor component 210 may activate a controlled descent mode in response to determining a surface temperature exceeds a threshold, while the control device 200 is performing a desiccation function, and the surface timer has not elapsed yet. For instance, during desiccation time for an oyster cage, the sensor component 210 may detect that the surface temperature has risen to above 100 degrees. In response to the temperature potentially killing the oysters, the sensor component 210 may activate a controlled descent mode. In some instances, the sensor component 210 can gather additional ambient environment data for the farming model to use. In various examples, the sensor component 210 may use one or more sensors to determine whether the surface condition meets the criteria to perform desiccation function: however, if the control device is too far submerge, the sensor component 210 may attempt to ping a remote device for the information.

The farming model(s) 212 can include a trained farming model or algorithm to determine farming logic for an aquatic pod based on a crop type. As discussed herein, the system may track data associated with the aquatic pods to continuously improve the farming model(s) 212. Initially, the control device 200 may receive input to set or modify one or more parameters for a simple farming model to use in determining the farming task logic. For instance, the control device 200 for an oyster cage may receive parameters to set a frequency, duration, and/or starting time (e.g., once a week, for 24 hours, at 7 am) of desiccation for the oyster cage. Accordingly, the controller component 214 may determine to hover at a feeding depth, and every Monday at 7 am, the oyster cage is raised above a surface level for a duration of 24 hours. After 24 hours, the controller component 214 returns the oyster cage to the hover function.

The system may receive and store data representing crop metrics, parameter values, harvest results, and sensor data. The system can receive and aggregate data from multiple aquatic pods. The system can use the aggregate data as training data to generate the farming model(s) 212 to correlate parameter values to the desired harvest result. For instance, when a pod is harvested, the remote device may ask the user to provide feedback to the system to rate one or more quality (e.g., size, taste, appearance, etc.) of the resulting crop. The pod data, including the harvest ratings, may be used as training data to generate an optimal farming model(s) 212 for a particular quality. Thus, as the system receives feedback data, the system may improve and optimize the parameters for cultivating a healthy crop. For instance, the system may determine a first model that minimizes desiccation frequency and maximizes the time at a feeding depth is correlated with producing larger meaty oysters. Additionally, the system may determine a second model that increases the desiccation duration, and cage agitation is correlated with producing smaller oysters with beautiful shells. In the present example, the remote device may present suggestions to configure a control device to use the first model to produce a larger crop and the second model to produce a more attractive crop.

The controller component 214 can receive parameters and/or farming models to control the farming task logic for the current pod. The controller component 214 may establish a communication link with a remote device to receive the parameters and input. Additionally, the controller component 214 may include functionality to control the vent valve to add or remove air from the buoyancy system to move the aquatic structure to a particular position to perform a particular farming task. Additional details and illustrations of how the controller component 214 moves the aquatic structure to a particular position to perform a particular farming task are provided in FIG. 6.

In some examples, the controller component 214 may receive input data or commands from a remote device. The commands may include, but is not limited to, a command to initiate farm mode for a particular crop type, or a command to surface for maintenance ("ascend command," "recall command"). The input data may include triggers to initiate aquafarming, data to guide farming logic, and/or data to initiate shellfish farm mode. The input data may set or modify one or more parameters for the farming model. The controller component 214 may receive input data to initiate aquaculture farming, wherein the input data includes at least one of a crop data or an aquatic structure data. The crop data may include but is not limited to: species type, aquatic organism type, crop type, shellfish type, oyster type, crop age, and the like. The aquatic structure data may include but is not limited to: mechanical structure type, structure identifier, fish pen type, an oyster cage type, a lobster trap type, a crab trap type, a kelp farming ring type, a mussel raft type, or a buoyancy control system configuration. The aquatic structure may include any mechanical structure, enclosure, vessel, and/or surface suitable for raising a particular aquatic organism type.

In some examples, the controller component 214 can directly control the vent valve or transmit a signal to the vent valve. To add or remove air, the controller component 214 may control one or more vent valves in quick bursts or "puffs" for a small amount of air compensation or hold the vent valve open for a large amount of air compensation. To add air, the controller component 214 may open an inflation inlet valve to allow air to flow from an air cylinder to the buoyancy chamber. To remove air, the controller component 214 may open an exhaust outlet valve to release air from the buoyancy chamber. The controller component 214 may interact with the buoyancy assistance component 110 to determine the amount of air compensation needed. In various examples, the controller component 214 may determine a measured air puff to release a specific volume of air needed as determined by the buoyancy assistance component 206.

The reporting component 216 can include functionality to store one or more metrics associated with one or more sensors and to send such metrics to a remote device. In some examples, the reporting component 216 can aggregate the metrics and send the aggregated metrics to the remote device. In some instances, the reporting component 216 can report the metrics as it is being received to the from the sensors. The reporting component 216 may determine, based at least in part on time-lapse, to transmit crop removal notification for at least one of maintenance or harvest. Based on the age of the crop, the reporting component 216 may notify a user, by transmitting a notice to the remote device, to divide the shellfish or to come for harvest.

In some instances, the reporting component 216 can correspond to the reporting component 112 of FIG. 1.

In some embodiments, the processor(s) 202 is a central processing unit (CPU), a graphics processing unit (GPU), or both CPU and GPU, or other processing unit or component known in the art.

The control device 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer-readable instructions, data structures, program modules, or other data. Memory 204, removable storage 218, and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the control device 200. Any such tangible computer-readable media can be part of the control device 200.

In various embodiments, the control device 200 can include applications including but are not limited, a web browser application, a diving application, and the like. During execution on the control device 102, each of the applications may be configured to cause the control device 102 to initiate data communications with the remote device 106 over the network(s) 108.

The control device 102 may be configured to communicate over a telecommunications network using any common wireless and/or wired network access technology. Moreover, the control device 102 may be configured to run any compatible device operating system (OS), including but not limited to, Microsoft Windows, Mac OS X, Linux, as well as any other common device OS.

The control device 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the control device 200 also includes one or more wired or wireless transceiver(s) 226. For example, the transceiver(s) 226 can include a network interface card (NIC), a network adapter, a LAN adapter, or a physical, virtual, or logical address to connect to various network(s) 108, or to the remote device 106, for example. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMax, Bluetooth, infrared communication, acoustic communication including underwater acoustic communications channel, and the like.

Figure 3:
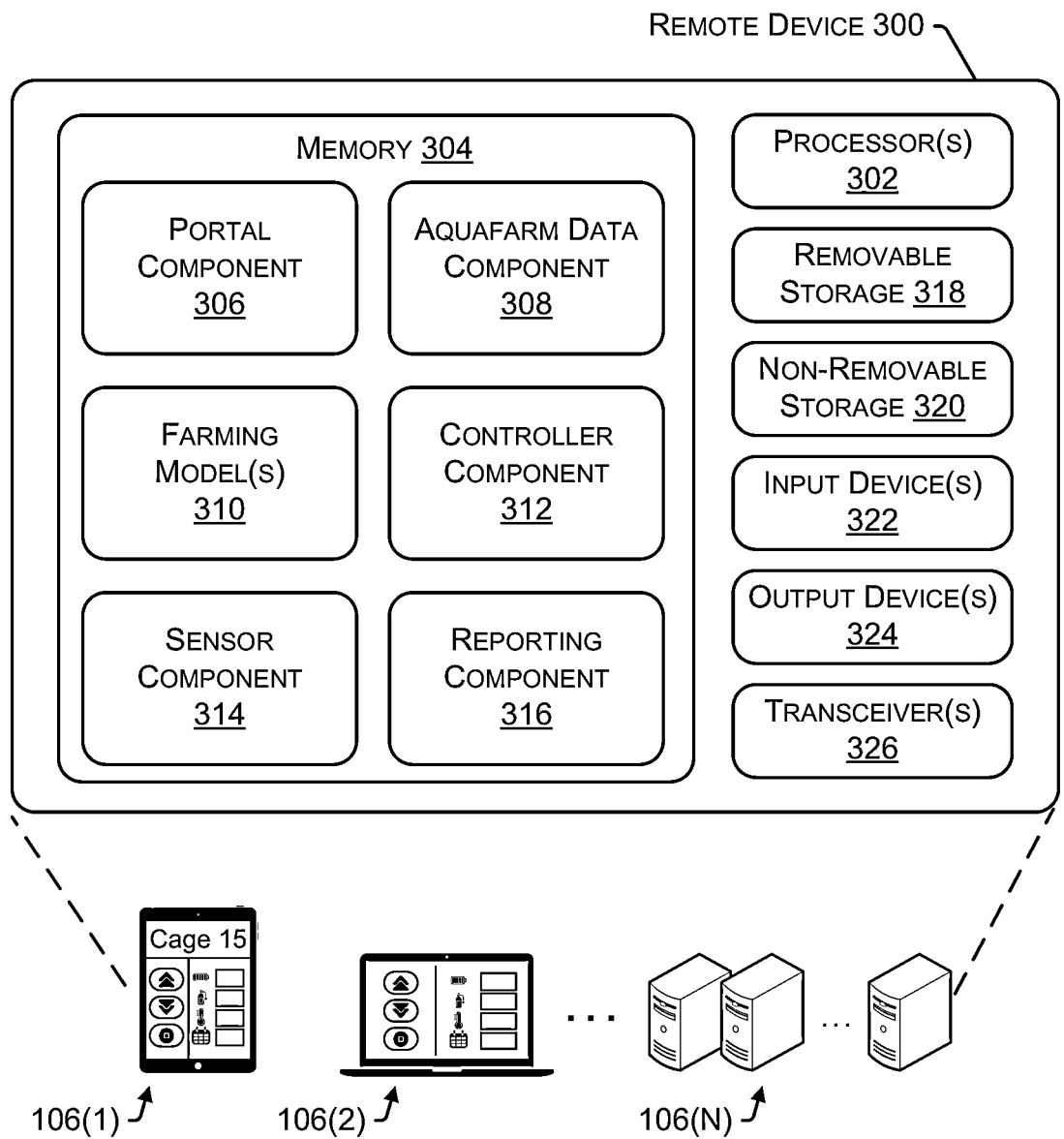
FIG. 3 illustrates an example remote device configured to implement the smart buoyancy components in aquaculture, in accordance with embodiments of the disclosure.

FIG. 3 illustrates an example remote device 300 configured to implement the smart buoyancy components in aquaculture, in accordance with embodiments of the disclosure. In some embodiments, the remote device 300 can correspond to the remote device 106 of FIG. 1. It is to be understood in the context of this disclosure that the remote device 300 can be implemented as a single device or as a plurality of devices with components and data distributed among them.

As illustrated, the remote device 300 comprises a memory 304 storing a portal component 306, an aquafarm data component 308, a farming model(s) 310, a controller component 312, a sensor component 314, and a reporting component 316. Also, the remote device 300 includes processor(s) 302, a removable storage 318 and non-removable storage 320, input device(s) 322, output device(s) 324, and transceiver(s) 326.

In various embodiments, the memory 304 is volatile (such as RAM), non-volatile (such as ROM, flash memory, etc.) or some combination of the two. The portal component 306, the aquafarm data component 308, the farming model(s) 310, the controller component 312, the sensor component 314, and the reporting component 316 stored in the memory 304 can comprise methods, threads, processes, applications or any other sort of executable instructions. The portal component 306, the aquafarm data component 308, the farming model(s) 310, the controller component 312, the sensor component 314, and the reporting component 316 can also include files and databases.

The portal component 306 can include functionality to provide an interface for a user to set up an aquafarm and associated the aquafarm with aquatic pods with associated control devices, as discussed herein. In some instances, the portal component 306 can provide an interface for a user to configure each aquatic pod. In some examples, the portal component 306 may configure the aquatic pod to be associated with raising a particular organism type and/or use an aquatic structure type, including a buoyancy system and a control device. The portal component 306 can establish a communication link with a control device and provide an interface for the user to send commands and data to the control device. The portal component 306 can allow a user to create different aquafarms and pods such that a report generated by the reporting component 316 may present data on the requested farm and pods.

The aquafarm data component 308 can receive a plurality of data and farming metrics from the crop data component 208 and store the metrics in a database. In some instances, the metrics can be indexed by crop types, structure types, sensors, and the like. In some instances, the aquafarm data component 308 can perform any statistical analysis on the metrics to determine a variety of farming parameters and characteristics. The aquafarm data component 308 can select a portion of the stored data to be used as training data for generating farming models. In various examples, the aquafarm data component 308 presents options to create training data by creating parameter variations to test a new crop. For instance, a farmer may wish to experiment with optimizing a farming model for a new type of oyster to receive medium-sized oysters with beautiful shells. The aquafarm data component 308 may present a few options with variations on parameter settings and may further allow the farmer to create additional variations. In the present example, the farmer may elect to experiment with ten small pods with different parameters to test for the potentially best harvest.

The farming model(s) 310 can train one or more machine-learning algorithms to associate parameter settings with harvest results. As described herein, the aquafarm data component 308 may track and aggregate data associated with the crop data to continuously improve the farming model(s) 310. The farming model(s) 310 can generate a trained farming model or algorithm to determine farming logic for an aquatic pod based on a crop type.

In some examples, the farming model(s) 310 may train one or more machine learning models using aggregated data gathered by the aquafarm data component 308. Machine learning generally involves processing a set of examples (called "training data") in order to train a machine learning model. A machine learning model, once trained, is a learned mechanism that can receive new data as input and estimate or predict a result as output. For example, a trained machine learning model can comprise a classifier that is tasked with classifying unknown input (e.g., an unknown image) as one of the multiple class labels (e.g., labeling the image as a cat or a dog). In the context of the present disclosure, the unknown input may include, inter alia, configuring a new aquatic pod raising a crop type with unknown parameters, and the trained machine learning model may be tasked with classifying the unknown input as one of the multiple class labels. The class labels, in this case, may correspond to a classification of the unknown data as a type of data among multiple different types of data corresponding to different farming tasks types that may or may not need to be performed. As described herein, the unknown parameters may correspond to the frequency and duration of different farming functions. The farming model(s) 310 may receive training data representing crop metrics, parameter values, harvest results, and sensor data. The farming model(s) 310 can receive and aggregate data from multiple aquatic pods. The farming model(s) 310 can use the aggregate data as training data to generate the farming model(s) 310 to correlate parameter values to the desired harvest result.

The machine learning model(s) may represent a single model or an ensemble of base-level machine learning models and may be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models, as stored by the farming model(s) 310, whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some instances, the farming model(s) 310 can correspond to the farming model(s) 212 of FIG. 2.

The controller component 312 can receive data from a plurality of sources and may determine to send commands to an aquatic pod. In some examples, the controller component 312 may receive, from a user via a user interface, one or more commands (e.g., "UP," "ASCEND," "RECALL," "DOWN," "GOTO," etc.) to control a particular aquatic pod associated with a particular pod identifier. In response to the receiving the command from the user, the controller component 312 may transmit the commands to the as be receive from a user inter. In an example, the controller component 312 may receive aggregate data from the aquafarm data component 308 and may determine based on the data from a first pod to send a command to change a farming task for a second pod. In some examples, the remote device 300 may include one or more devices sitting above the water surface near the pods, and the controller component 312 may receive sensor data from the sensor component 314 and can determine to change a farm task for a group of aquatic pods within a particular geographical location.

The sensor component 314 can include functionality to receive and process sensor data from one or more sensors (e.g., a barometer, a water pressure sensor, a temperature sensor, a salinity sensor, an air pressure sensor (e.g., of an air supply), timer, accelerometer, GPS, etc.) above a water surface, as discussed herein. The sensor data may be received from one or more sensor that provides information on ambient conditions, including salinity, pressure, wave force, an altitude of the body of water, velocity, acceleration, or any parameter that may be needed as known to those skilled in the art to control buoyancy ascent, descent and the like. In some examples, the sensor component 314 may use any wave and/or surface condition measuring devices (e.g., buoys, wind sock, accelerometer, etc.) to determine wave force including wave height, the wave frequency, and the wind speed. In various examples, the sensor component 314 can include functionality to present processed sensor data on a user interface on the remote device 300, for example, to indicate surface conditions near an aquatic pod. The sensor component 314 may determine whether the surface condition meets the criteria to perform the desiccation function and may transmit the surface condition data to a control device.

The reporting component 316 can include functionality to receive aggregate data to generate overview reports for the aquafarm. As described herein, the aquafarm data component 308 may collect feedback data for the system to improve and optimize the parameters for cultivating a healthy crop. The aquafarm data component 308 can receive and aggregate data from multiple aquatic pods. The reporting component 316 can also use the aggregate data to generate overview reports for the aquafarm and determine a maintenance plan for specific aquatic pods and send a notification to a user with the maintenance plan. In some examples, the reporting component 316 can present data generated by farming models to provide analysis on parameters that could change a particular harvest outcome.

In some embodiments, the processor(s) 302 is a central processing unit (CPU), a graphics processing unit (GPU), or both CPU and GPU, or other processing unit or component known in the art.

The remote device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and nonvolatile, removable and non-removable media implemented in any method or technology for storage of information, such as computer-readable instructions, data structures, program modules, or other data. Memory 304, removable storage 318, and non-removable storage 320 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the remote device 300. Any such tangible computer-readable media can be part of the remote device 300.

The remote device 300 can include input device(s) 322, such as a keypad, a cursor control, a touch-sensitive display, etc. Also, the remote device 300 can include output device(s) 324, such as a display, speakers, etc. These devices are well known in the art and need not be discussed at length here.

As illustrated in FIG. 3, the remote device 300 can include one or more wired or wireless transceiver(s) 326. The transceiver(s) 326 can be any sort of wireless transceivers capable of engaging in wireless, radio frequency (RF) communication. The transceiver(s) 326 can also include other wireless modems, such as a modem for engaging in Wi-Fi, WiMax, Bluetooth, infrared communication, or the like.

As can be understood, any of the components and/or functions illustrated in FIGS. 1-3 can be combined in any order and/or implemented in any device.

Figure 4:
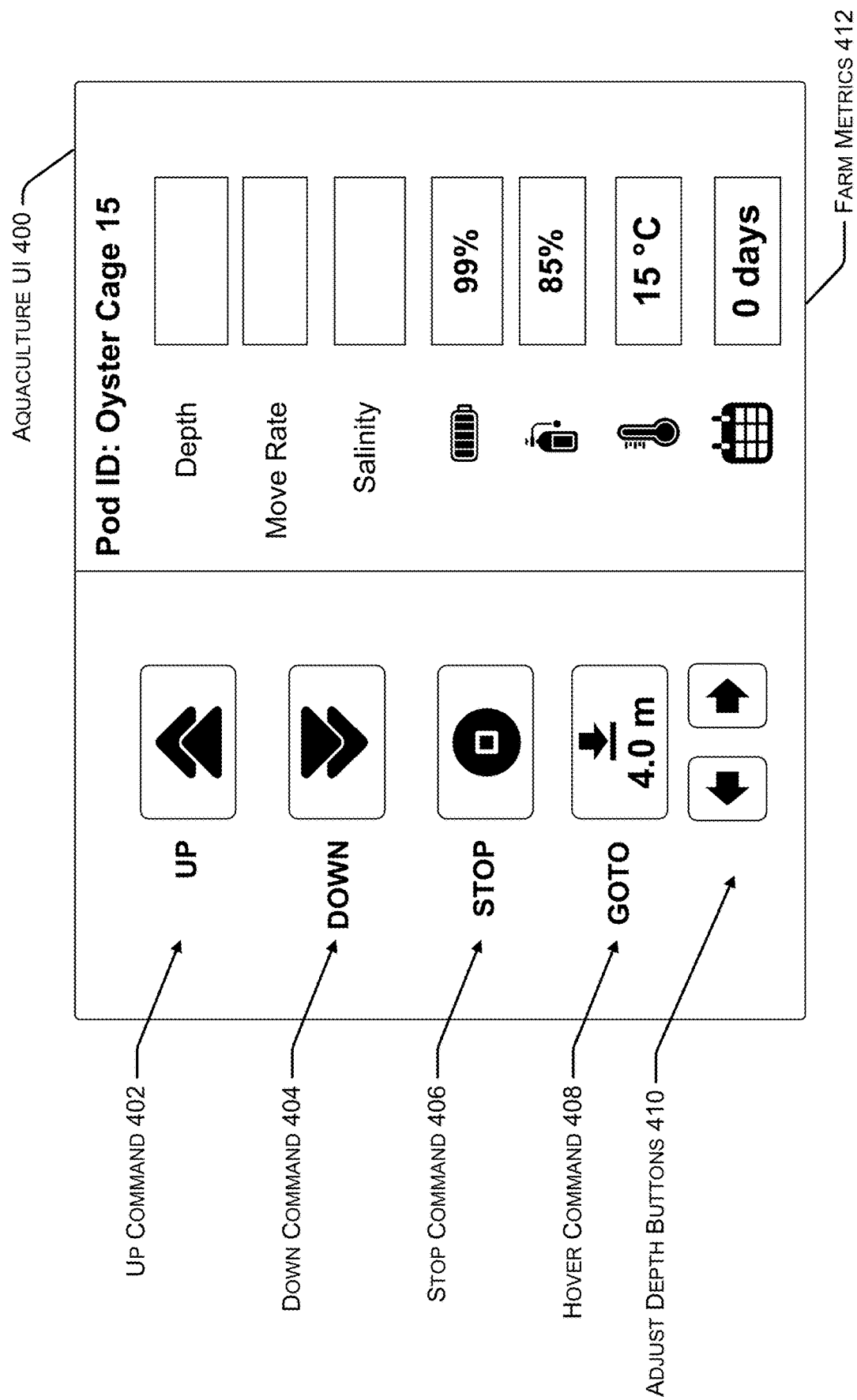
FIG. 4 illustrates an example user interface of the computing device implementing the smart buoyancy components in aquaculture, as discussed herein.

FIG. 4 illustrates an example user interface of the remote device implementing the smart buoyancy components in aquaculture, as discussed herein. In some instances, the example user interface can be represented as an aquaculture user interface (UI) 400.

In some instances, the aquaculture UI 400 can present various selectable buttons, including an example up command 402, an example down command 404, an example stop command 406, an example hover command 408, and example adjust depth buttons 410, in a user interface. Further, the aquaculture UI 400 can represent various data captured by a connected control device, including farm metrics 412, which can correspond to environmental data and/or farming metrics collected by a control device, as discussed herein. In some instances, the aquaculture UI 400 can present a different user interface for a user to configure and manage different aquatic pods associated with an aquafarm. In a present example, the aquaculture UI 400 is presented after the configuration of a new aquatic pod with a crop age of "0 days" and associated with pod identifier "Oyster Cage 15." The aquaculture UI 400 presents the selectable buttons to enable the user to initiate aquafarming functions at the aquatic pod "Oyster Cage 15".

In various instances, the aquaculture UI 400 can present additional information, including crop age, water temperature, air in the cylinder, battery life, and the like.

In the present example, the aquaculture UI 400 presents a sample user interface to allow a user: to activate controlled ascent mode by selecting example up command 402: to activate controlled descent mode by selecting example down command 404: to activate stop action mode by selecting example stop command 406; and to activate hover mode by selecting example hover command 408. The example adjust depth buttons 410 allows the user to set the depth level for the aquatic pod to descend down to in response to the example hover command 408 and maintain neutral buoyancy at the depth level for feeding.

In some instances, the aquaculture UI 400 can be generated by the portal component 306 and reporting component 316 and include sensor data received by the sensor component 210 and the sensor component 314 (e.g., a surface temperature), as discussed herein. The sensor data may indicate farm metrics including current depth, air remaining in air cylinder, current ascent/descent rate, total submerged time, current time, and temperature. Of course, the example user interface is not limited to the aquaculture UI 400. Further, the selectable icons are not limited to the example up command 402, the example down command 404, the example stop command 406, the example hover command 408, and the example adjust depth buttons 410.

Figure 5:
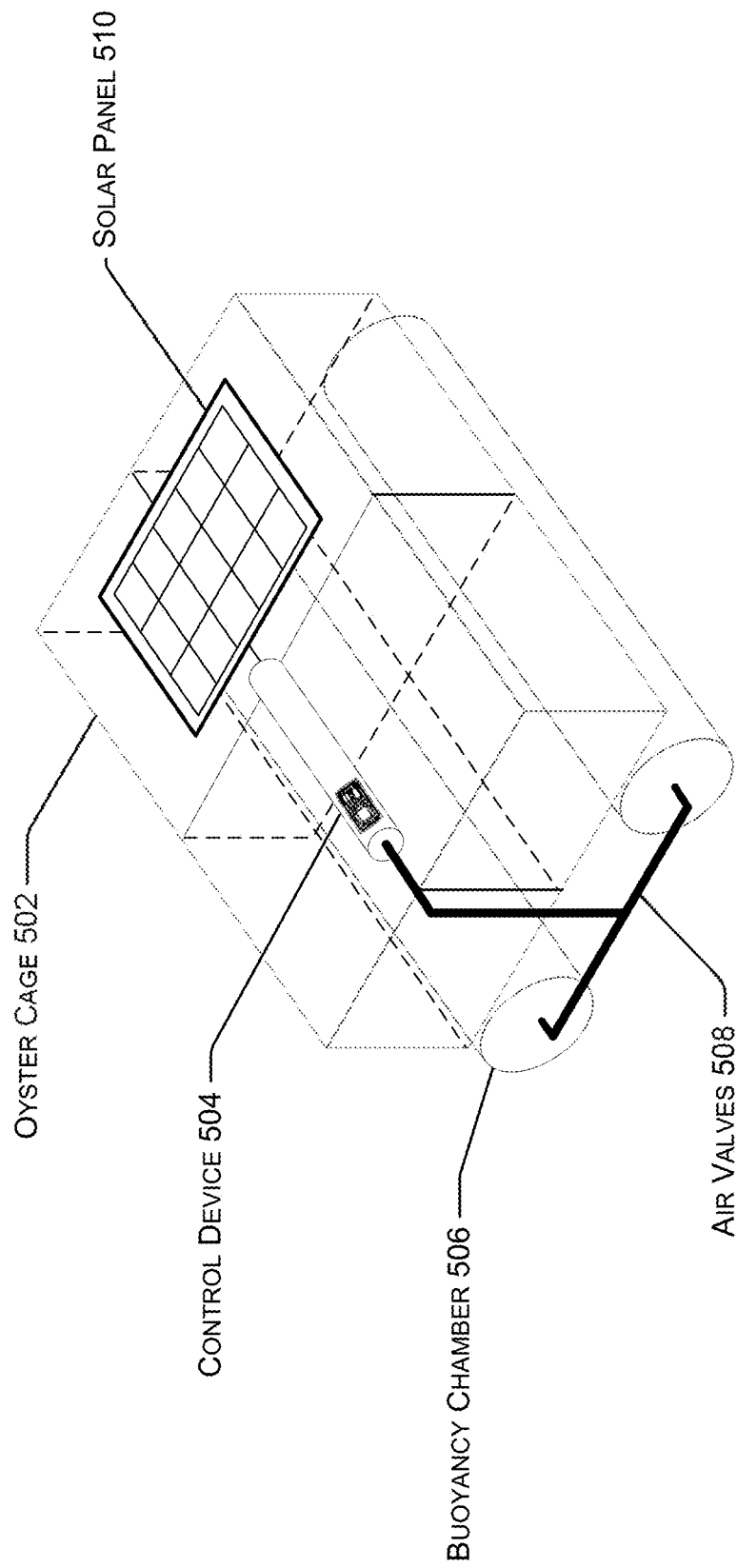
FIG. 5 illustrates an isometric view of an example aquatic structure, including an example oyster cage.

FIG. 5 illustrates an isometric view of an example aquatic structure, including an example oyster cage. In some instances, the example aquatic structure can be represented as an example aquatic structure 500.

In some instances, the example aquatic structure 500 can include an example oyster cage 502, a control device 504, a buoyancy chamber 506, air valves 508, and a solar panel 510.

The control device 504 is housed in a rigid structure. In some example embodiment, the housing includes a custom-machined pressure-tolerant enclosure with O-ring seals for the connectors and access points. This enclosure may house the processing electronics and energy storage for the control device 504. The housing may accommodate the control device 504 and may include a control algorithm coprocessor board, a single communication modem OEM board, and the battery supply. The external housing ports may accommodate connection of signal breakout cabling to allow individual connection of up to twelve electrically controlled bidirectional pneumatic valves, a single programming interface, up to two external three-wire interface sensors, and a battery charge connection. The wired communication may include a single CAT 5e ethernet port.

To provide pneumatic control for the air displacement and buoyancy compensation mechanisms, the pneumatic solenoid valves are ruggedized for operation in fresh or saltwater depths up to 100 m. The ruggedization of the valves to support the modular integration of the prototype may include custom urethane encapsulation by injection mold. The watertight connectors may mate with the breakout cables from the main enclosure.

In some examples, the air for the example aquatic structure 500 is held in a closed system, wherein the buoyancy chamber 506 includes a rigid buoyancy case and a flexible buoyancy bag inside the rigid case. The air is moved between the buoyancy bag and the pressure vessel, making the buoyancy bag expand or contract according to buoyancy requirements.

The example aquatic structure 500 may include multiple buoyancy chamber, including the buoyancy chamber 506, and may effectively adjust the buoyancy of collapsing (balloon-like) or hard-shell gas containers of this figure so that: a submerged structure can hover a few feet below wave troughs at a constant distance from the seafloor with a tropical storm passing overhead, and submerged structures can be made to move up or down or hover at constant depth even with changing current. The physical buoyancy adjustment is made by adding or removing water (using compressing air, or pumping water in or out) inside rigid cylinders or spheres. The cylinders of the buoyancy chamber 506 can include HDPE-coated corrugated steel storm drain pipe with crush depth near the maximum expected.

Figure 6:
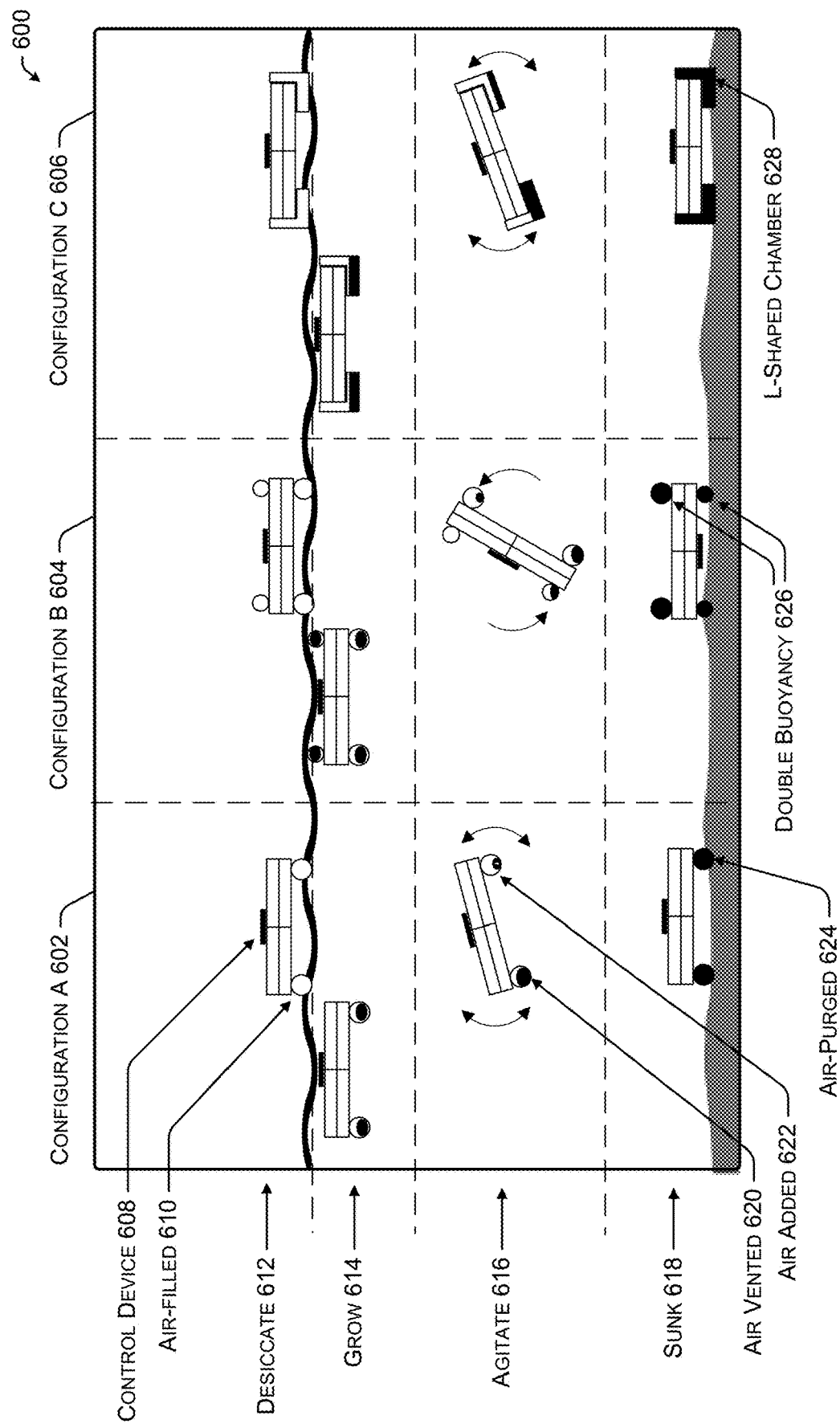
FIG. 6 is a diagram illustrating some example configurations of aquatic structures with shellfish cages.

FIG. 6 is a diagram illustrating some example configurations of aquatic structures with shellfish cages. In some instances, the example configurations can be represented as example configurations 600.

In some instances, the example configurations 600 can present shellfish cages as an example configuration A 602, an example configuration B 604, and an example configuration C 606.

In additional examples, each configuration of the example configuration A 602, the example configuration B 604, and the example configuration C 606 are illustrated in different positions as it performs a particular farming task. The farming tasks include example task desiccate 612, example task grow 614, example task agitate 616, and example task sunk 618.

In the example task grow 614, the example cages are lifted above the water surface for drying. Each configuration fills all the buoyancy chambers with air, as represented by an example air-filled 610. For instance, the shellfish cage presented in the example configuration A 602 includes a control device 608 and the cage lifted above the water surface.

In the example task grow 614, the three configurations of shellfish cages are hovering near the surface to feed on algae near the surface.

In the example task agitate 616, the example shellfish cages are lowered from the surface, and the buoyancy chambers may alternate between air vented 620 and air added 622 to rock the cage back and forth. Additionally, the example configuration B 604 includes double buoyancy 626, which allows the system to perform a full roll to agitate the shellfish.

In the example task sunk 618, the example shellfish cages are lowered to the seafloor to protect the shellfish from the extreme cold temperature. In the example configuration C 606, the buoyancy chambers are changed from cylinders to the example L-shaped chamber 628 to lift the cage off the seafloor. The example L-shaped feet allow the cage to rest in the horizontal position on the ocean floor, keeps the shellfish off the dirt and dust, and allows shellfish on the bottom to feed on the ocean floor.

Figure 7:
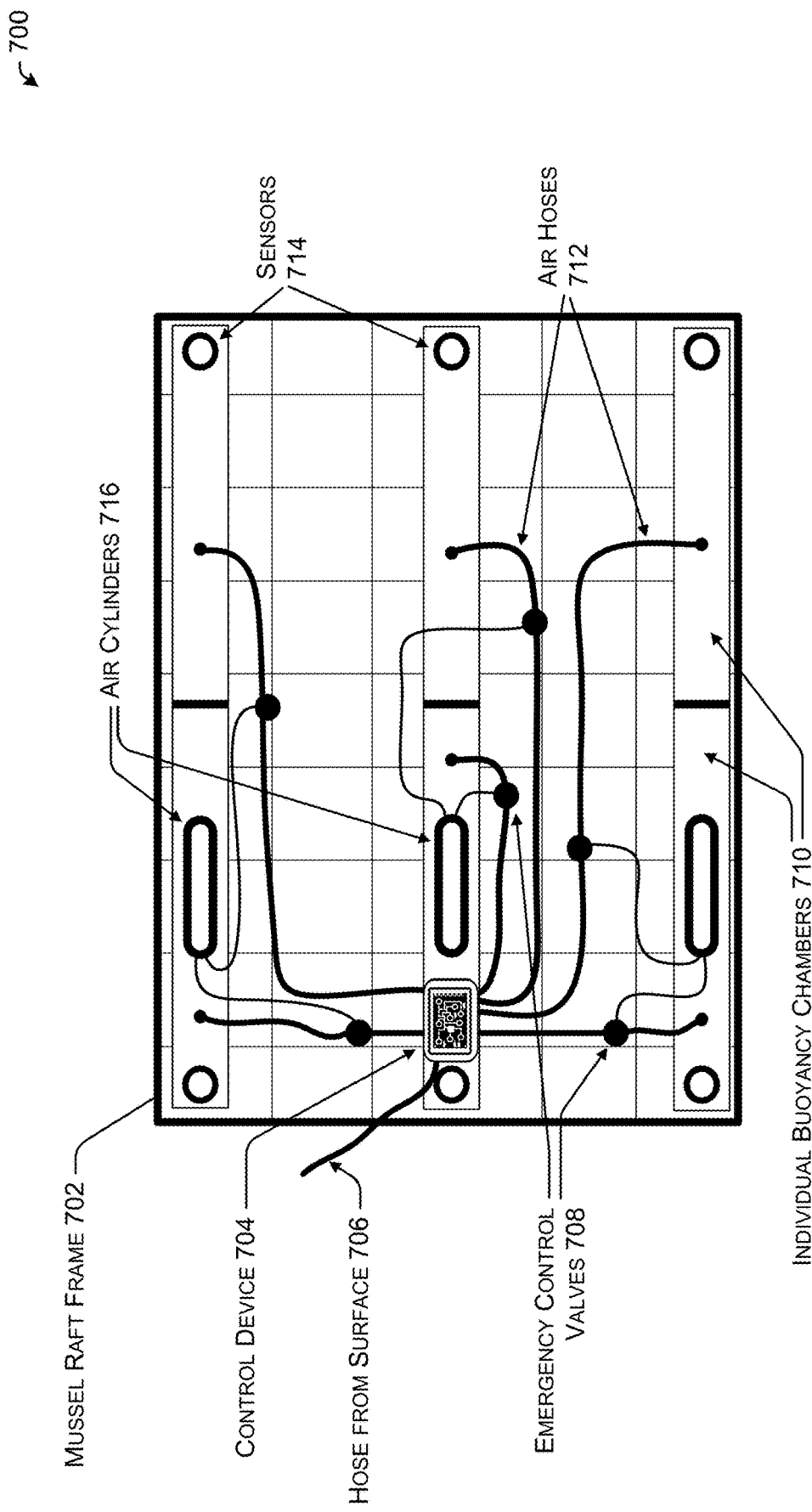
FIG. 7 illustrates a top view of an example aquatic structure, including a mussel raft.

FIG. 7 illustrates a top view of an example aquatic structure, including a mussel raft. In some instances, the example aquatic structure can be represented as an example aquatic structure 700.

In some instances, the example aquatic structure 700 can include an example mussel raft frame 702, a control device 704, a hose from surface 706, emergency control valves 708, individual buoyancy chambers 710, air hoses 712, sensors 714, and air cylinders 716.

In some examples, the example aquatic structure 700 may include the hose from surface 706 to allow an air compressor to fill the individual buoyancy chambers 710. The example aquatic structure 700 may include an example emergency buoyancy system comprising the emergency control valves 708 and the air cylinders 716.

The hose from surface 706 may provide an endless air supply. However, if the control device 704 determines that the hose from surface 706 does not provide air as expected, the control device 704 may activate the emergency control valves 708 to provide air to the individual buoyancy chambers 710 using the air cylinders 716. After triggering the emergency buoyancy system, the control device 704 may transmit a notification for maintenance on the hose.

Figure 8:
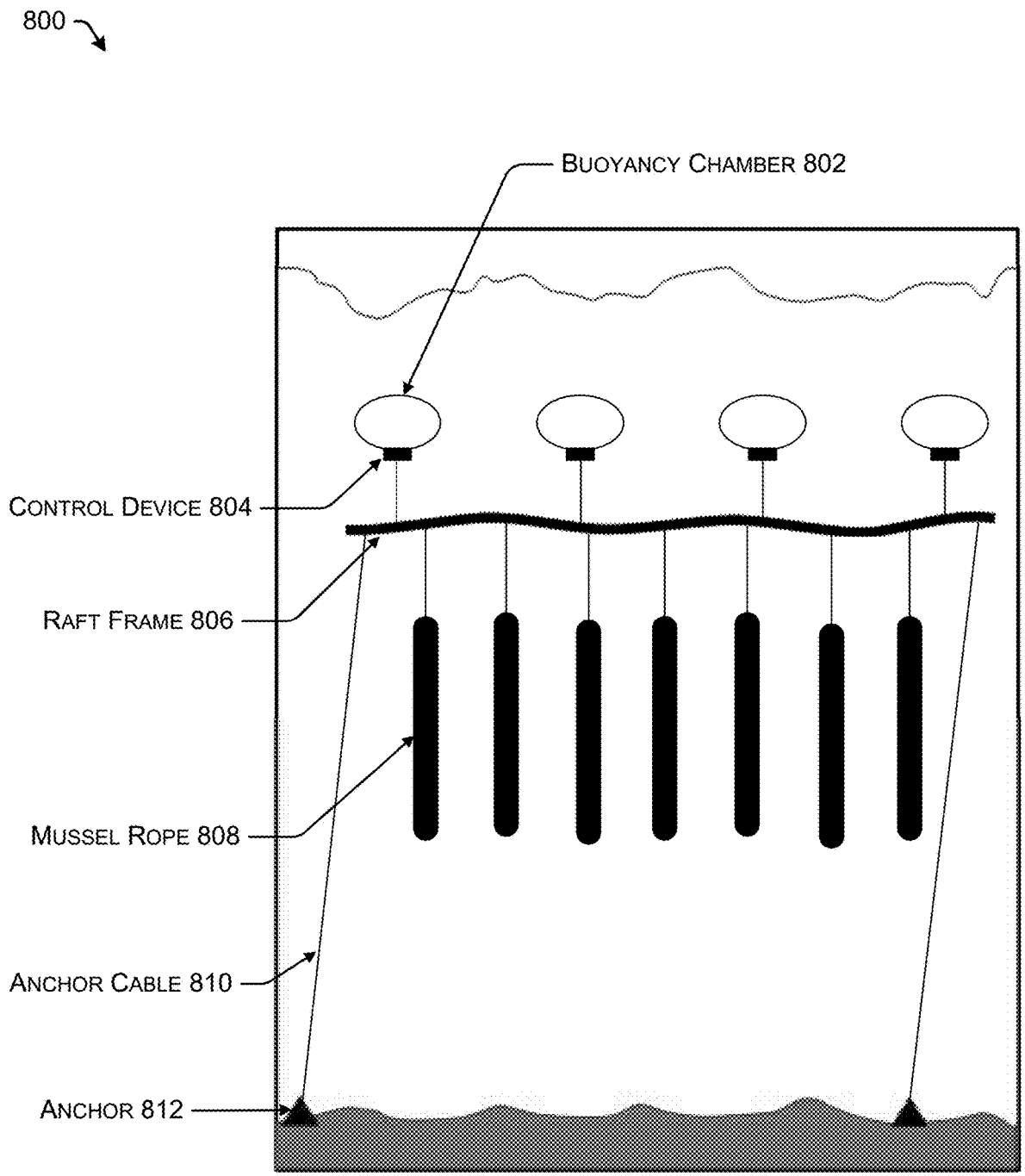
FIG. 8 is a diagram illustrating the abilities of an example smart buoyancy system in maintaining buoyancy control in mussel farming.

FIG. 8 is a diagram illustrating the abilities of an example smart buoyancy system in maintaining buoyancy control in mussel farming. In some instances, the example smart buoyancy system can be represented as example system 800.

In some instances, the example system 800 may include example buoyancy chamber 802, example control device 804, example raft frame 806, example anchor cable 810, and example anchor 812.

The example system 800 may include bolting to the example raft frame 806 on the four corners to the example anchor 812. The control device 804 controls the example buoyancy chamber 802 includes a rigid vessel, and buoyancy is changed by adding or removing water and/or air to change the depth.

Figure 9:
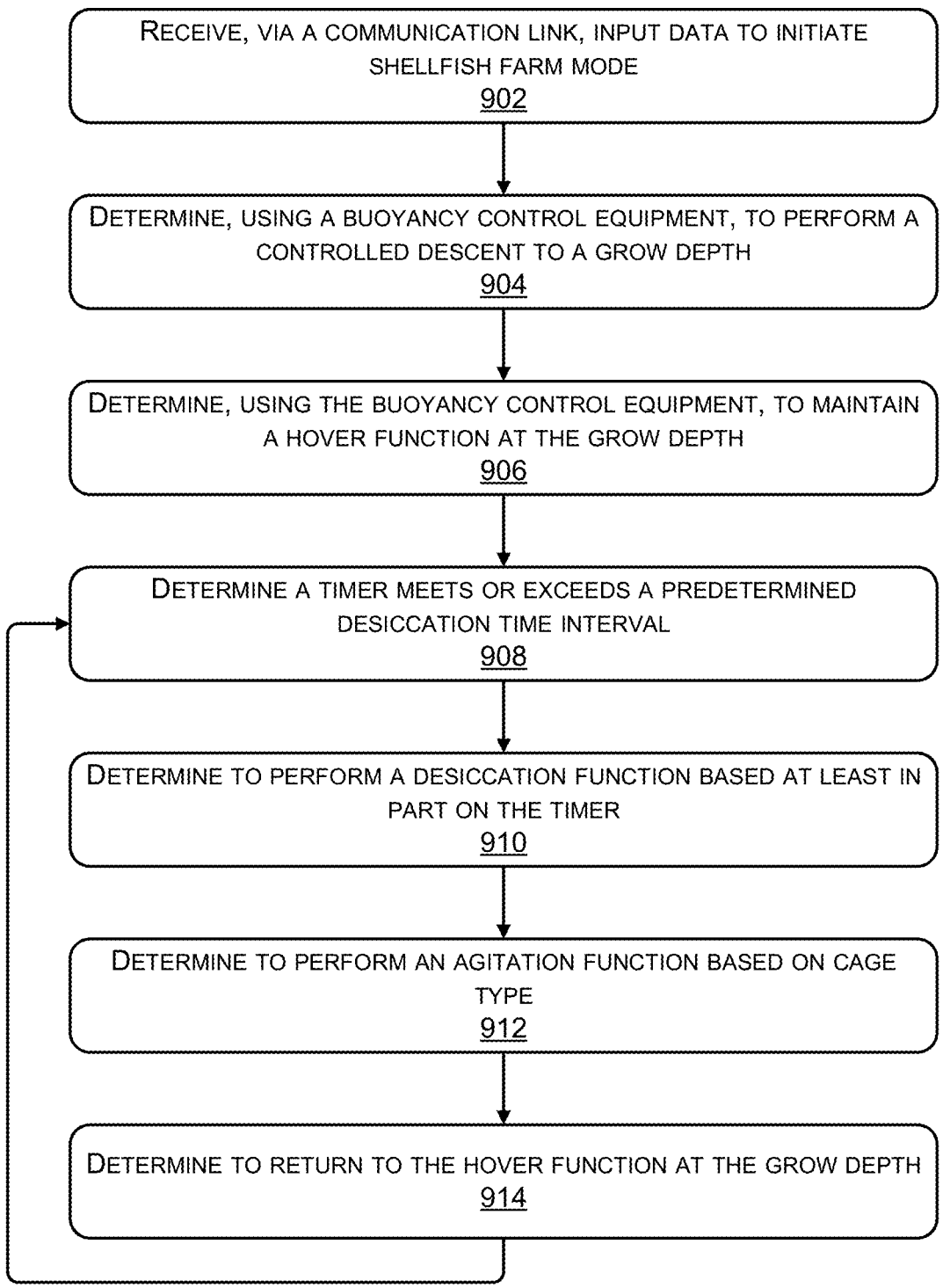
FIG. 9 illustrates an example process for determining buoyancy control in performing shellfish farming functions, as discussed herein.
Figure 10:
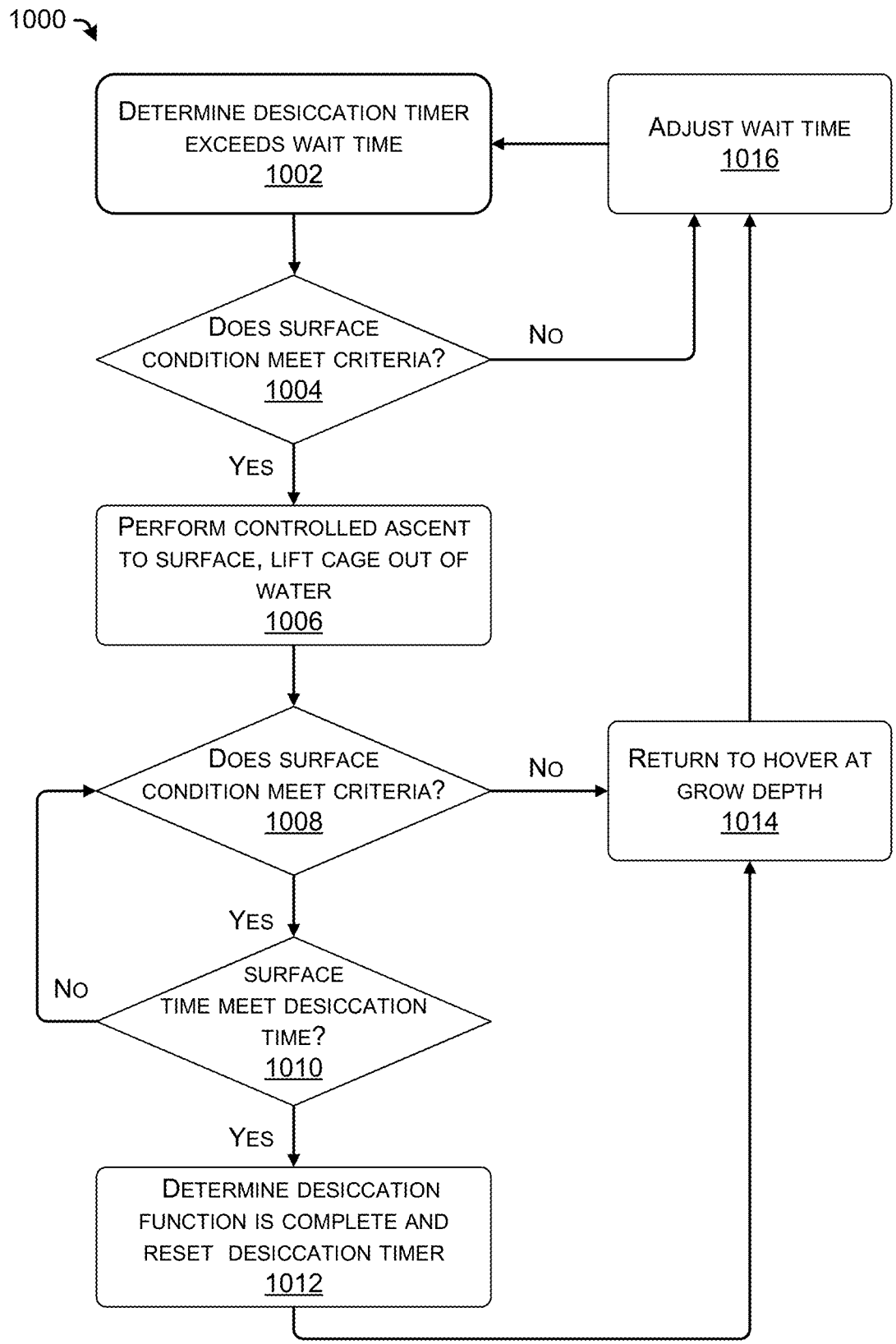
FIG. 10 illustrates an example process for determining buoyancy control in performing desiccation function in shellfish farming, as discussed herein.

FIGS. 9, 10, and 11 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 9 illustrates an example process 900 for determining buoyancy control in performing shellfish farming functions, as discussed herein. The example process 900 can be performed by the control device 102 and 200 (or another component), and other components discussed herein. Some or all of the process 900 can be performed by one or more devices, equipment, or components illustrated in FIGS. 1-3, for example.

At operation 902, the process can include receiving, via a communication link, input data to initiate shellfish farm mode. As discussed herein, a controlling device may establish a communication link with a remote device and may receive input data or commands from a user. The commands may include a command to initiate farm mode for a particular crop type or a command to surface for maintenance. The input data may include triggers to initiate aquafarming and may include data to guide farming logic. The input data may set or modify one or more parameters for the farming model.

At operation 904, the process can include determining, using the buoyancy control equipment, to perform a first controlled descent to a feeding depth. As discussed herein, the control device may receive input to initiate aquafarming functions to perform a controlled ascent and a level hold function at a predetermined feeding depth. The level hold function allows an aquatic structure to remain at or near the predetermined feeding depth while underwater. The buoyancy system may use signal data from one or more sensors to determine whether to adjust an amount of air in a buoyancy chamber to "hover" at the predetermined feeding depth. To maintain a hover at the feeding depth, the system may adjust an amount of air in the buoyancy chamber to establish neutral buoyancy.

At operation 906, the process can include determining, using the buoyancy control equipment, to maintain a hover function at the grow depth. As discussed herein, the buoyancy system may use signal data from one or more sensors to determine whether to adjust an amount of air in a buoyancy chamber to "hover" at the predetermined feeding depth. To maintain a hover at the feeding depth, the system may adjust an amount of air in the buoyancy chamber to establish neutral buoyancy.

At operation 908, the process can include determining a timer meets or exceeds a predetermined desiccation time interval. As discussed herein, the control device may determine a timer meets or exceeds a predetermined desiccation time interval and/or perform a controlled ascent at the predetermined starting time.

At operation 910, the process can include determining to perform a desiccation function based at least in part on the timer. As discussed herein, the control device may determine to perform a desiccation function based at least in part on the timer.

At operation 912, the process can include determining to perform an agitation function based on cage type. As discussed herein, the control device may perform an agitation function based on cage type. The agitation function includes the agitate mode and the roll mode and is triggered to imitate a tumbling and/or shaking the oysters to break the edges off the shells leading to a more marketable shape.

At operation 914, the process can include determining to return to hover function at the grow depth. As discussed herein, after the agitation function is complete, the control device may determine to return to hover function at the grow depth and/or feeding depth.

FIG. 10 illustrates an example process 1000 for determining buoyancy control in performing desiccation function in shellfish farming, as described herein. The example process 1000 can be performed by the control device 102 and 200 (or another component), in connection with the remote device 106 and 300 (or another component), and other components discussed herein. Some or all of the process 1000 can be performed by one or more devices, equipment, or components illustrated in FIGS. 1-3, for example.

At operation 1002, the process can include determining desiccation timer exceeds wait time. As discussed herein, the control device may determine a desiccation timer exceeds wait time.

At operation 1004, the process can include determining whether the surface condition meets the criteria. As discussed herein, a sensor component may determine whether the surface condition meets criteria to perform desiccation function. If the surface condition meets criteria (e.g., "yes" in operation 1004), the process can continue to operation 1006. Otherwise, if the surface condition fails to meets the criteria (e.g., "no" in operation 1004), the process continues to operation 1016.

At operation 1006, the process can include performing controlled ascent to surface, lift cage out of water. As discussed herein, a buoyancy assistance component may perform a controlled ascent at the predetermined starting time and may add more air to the buoyancy chamber, at or near the water surface, to lift a cage or structure out of the waters.

At operation 1008, the process can include determining whether the surface condition meet criteria. As discussed herein, a sensor component may determine whether the surface condition meets the criteria to perform the desiccation function. If the surface condition meets criteria (e.g., "yes" in operation 1008), the process can continue to operation 1010. Otherwise, if the surface condition fails to meets the criteria (e.g., "no" in operation 1008), the process continues to operation 1014.

At operation 1010, the process can include determining whether the surface time meet desiccation time. As discussed herein, the control device may determine whether a timer meets or exceeds a predetermined desiccation time interval at or near the surface. If the surface time meets desiccation time (e.g., "yes" in operation 1010), the process can continue to operation 1012. Otherwise, if the surface time fails to meet desiccation time (e.g., "no" in operation 1010), the process continues to operation 1008.

At operation 1012, the process can include determining desiccation function is complete and reset desiccation timer. As discussed herein, the control device may determine desiccation function is complete and reset desiccation timer. The process continues to operation 1014.

At operation 1014, the process can include returning to hover at grow depth. As discussed herein, after the desiccation mode and/or the desiccation function is complete, the buoyancy assistance component may determine to return to hover function at the grow depth or feeding depth.

At operation 1016, the process can include adjusting wait time. As discussed herein, the control device may determine to extend a wait time based on surface condition. The process returns to operation 1002.

FIG. 11 illustrates an example process 1100 for determining buoyancy control in performing aquaculture farming functions, as discussed herein. The example process 1100 can be performed by the remote device 106 and 300 (or another component), in connection with the control device 102 and 200 (or another component), and other components discussed herein. Some or all of the process 1100 can be performed by one or more devices, equipment, or components illustrated in FIGS. 1-3, for example.

At operation 1102, the process can include receiving input data to initiate aquaculture farming, wherein the input data includes at least one of a crop data or an aquatic structure data. As discussed herein, the control device may receive input data to initiate aquaculture farming, wherein the input data includes at least one of a crop data or an aquatic structure data.

At operation 1104, the process can include determining to maintain a hover function at a grow depth. As discussed herein, the control device may receive input to initiate aquafarming functions to perform a controlled ascent and a level hold function at a predetermined feeding depth. The level hold function allows an aquatic structure to remain at or near the predetermined feeding depth while underwater. The buoyancy system may use signal data from one or more sensors to determine whether to adjust an amount of air in a buoyancy chamber to "hover" at the predetermined feeding depth. To maintain a hover at the feeding depth, the system may adjust an amount of air in the buoyancy chamber to establish neutral buoyancy.

At operation 1106, the process can include determining, based at least in part on one or more sensors, that an environment condition meets or exceeds one or more crop risk conditions. As discussed herein, the control device may determine, based at least in part on one or more sensors, that an environment condition meets or exceeds one or more crop risk conditions. Additionally and/or alternatively, the control device may determine the ambient temperature at a feeding depth that is too cold for the shellfish in the shellfish cage and initiate the controlled descent mode to move the shellfish cage to the seafloor for winterizing protection.

At operation 1108, the process can include determining to descent from the grow depth to a safety hover depth based at least in part on the environment condition. Additionally and/or alternatively, the control device may determine the ambient temperature at a feeding depth that is too cold for the shellfish in the shellfish cage and initiate the controlled descent mode to move the shellfish cage to the seafloor for winterizing protection.

At operation 1110, the process can include determining to maintain a hover function at the safety hover depth. As discussed herein, the buoyancy assistance component may determine to descent from the grow depth to a safety hover depth based at least in part on the environment condition. In response to extreme weather, the safety hover depth may be at or near the seafloor for a cage type, but a mussel rope or similar may be set at the seafloor minus the length of the rope.

At operation 1112, the process can include determining to return to the grow depth after a predetermined time has elapsed. As discussed herein, the control device may determine to return to the grow depth after a predetermined time has elapsed, but the control device may continue to monitor whether the environmental condition that meets or exceeds the one or more crop risk conditions remains. If the environment condition did not improve, the buoyancy assistance component may determine to descent back to the safety hover depth again.

At operation 1114, the process can include determining, based at least in part on time lapse, to transmit crop removal notification for at least one of maintenance or harvest. As discussed herein, the control device may determine, based at least in part on time-lapse, to transmit crop removal notification for at least one of maintenance or harvest. Based on the age of the crop, the control device notifies a user, by transmitting a notice to the remote device, to divide the shellfish or to come for harvest.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Further, any of the claims can be combined in any order or can be claimed as a system, device, computer-readable media, or any other implementation.

What is claimed is:

1. A system comprising:
    one or more processors;
    a memory; and
    one or more components stored in the memory and executable by the one or more processors to perform operations comprising:
        receiving, via a communication link, input data to initiate aquafarming, wherein the input data includes crop data and aquatic structure data, the crop data indicative of a mussel type, and the aquatic structure data indicative of a mussel raft comprising one or more mussel ropes;
        determining, using a buoyancy control equipment, to perform a controlled descent to a grow hover depth;
        determining to maintain a hover function at a grow depth;
        determining, based at least in part on sensor data received from one or more sensors, that an environmental condition meets one or more crop risk conditions;
        determining to descend from the grow depth to a safety hover depth, wherein the safety hover depth is based at least in part on the environmental condition and a maximum length of the one or more mussel ropes;
        determining, using the buoyancy control equipment, to perform a controlled descent to the safety hover depth; and
        determining to return to the grow hover depth after a predetermined time has lapsed.

2. The system of claim 1, wherein the communication link includes a wireless link including an acoustic link or electromagnetic field link.

3. The system of claim 1, wherein the crop data includes information associated with one or more of a sea life category, a shellfish type, a plant type, a shellfish species, a crop age, or transferred crop data, the transferred crop data including data associated with a particular crop after crop division.

4. The system of claim 1, wherein the aquatic structure data includes information associated with one or more of structure identifier, fish pen type, an oyster cage type, a lobster trap type, a crab trap type, a kelp farming ring type, a mussel raft type, or a buoyancy control system configuration.

5. The system of claim 1, wherein the one or more crop risk conditions include weather data, temperature data, or wave height data.

6. The system of claim 1, wherein the aquatic structure data includes a buoyancy control system comprising an emergency recovery system, and the operations further comprise:
 determining to initiate a controlled ascent;
 determining that the buoyancy control system is unable to inflate one or more buoyancy chambers using a primary air source;
 determining to use one or more compressed air cylinders of the emergency recovery system to inflate the one or more buoyancy chambers; and
 determining to generate a maintenance notification for recovery of an associated aquatic structure based at least in part on using the emergency recovery system.

7. The system of claim 1, wherein the crop data includes an oyster type, the aquatic structure data includes an oyster cage type, and the operations further comprise:
 determining to perform a desiccation function at predetermined desiccation time intervals, wherein the predetermined desiccation time intervals are based at least in part on an associated crop age.

8. The system of claim 7, wherein the operations further comprise:
 determining to perform an agitation function after the desiccation function based at least in part on the associated crop age, wherein the agitation function includes performing one of a cage rocking function or a cage roll function based at least in part on the oyster cage type including a double buoyancy system.

9. The system of claim 1, wherein the operations further comprise:
 transmitting, via the communication link, a crop removal notification based at least in part on an associated crop age.

10. A method comprising:
 receiving input data to initiate aquafarming, wherein the input data includes crop data and aquatic structure data, the crop data indicating an oyster type, and the aquatic structure data indicating an oyster cage type;
 determining, using buoyancy control equipment, to perform a controlled descent to a grow hover depth;
 determining to maintain a hover function at a grow depth;
 determining, based at least in part on sensor data received from one or more sensors, that an environmental condition meets one or more crop risk conditions;
 determining to descend from the grow depth to a safety hover depth based at least in part on the environmental condition;
 determining, using the buoyancy control equipment, to perform a controlled descent to the safety hover depth;
 determining to return to the grow hover depth after a predetermined time has lapsed; and
 determining to perform a desiccation function at predetermined desiccation time intervals, wherein the predetermined desiccation time intervals are based at least in part on an associated crop age.

11. The method of claim 10, the method further comprising:
 determining to perform an agitation function after the desiccation function based at least in part on the associated crop age, wherein the agitation function includes performing a cage rocking function or a cage roll function based at least in part on the oyster cage type including a double buoyancy system.

12. The method of claim 10, wherein the oyster cage type includes a double buoyancy system, the method further comprising:
 determining, based at least in part on the double buoyancy system, to perform an agitation function after the desiccation function, wherein performing the agitation function includes alternating airflow in and out of buoyancy chambers of the double buoyancy system to cause the oyster cage type to rock from back and forth.

13. The method of claim 10, wherein the crop data includes information associated with one or more of a sea life category, a shellfish type, a plant type, a shellfish species, a crop age, or transferred crop data, the transferred crop data including data associated with a particular crop after crop division.

14. The method of claim 10, wherein the aquatic structure data includes information associated with one or more of structure identifier, fish pen type, an oyster cage type, a lobster trap type, a crab trap type, a kelp farming ring type, a mussel raft type, or a buoyancy control system configuration.

15. A device comprising:
 one or more processors;
 a memory; and
 one or more components stored in the memory and executable by the one or more processors to perform operations comprising:
  receiving input data to initiate aquafarming, wherein the input data includes crop data and aquatic structure data, the crop data indicating at least one of an oyster type or a shellfish type, the aquatic structure data indicating a cage type comprising a double buoyancy system;
  determining, using buoyancy control equipment, to perform a controlled descent to a grow hover depth;
  determining to maintain a hover function at a grow depth;
  determining, based at least in part on sensor data received from one or more sensors, that an environmental condition meets one or more crop risk conditions;
  determining to descend from the grow depth to a safety hover depth based at least in part on the environmental condition;
  determining, using the buoyancy control equipment, to perform a controlled descent to the safety hover depth;
  determining to return to the grow hover depth after a predetermined time has lapsed;
  determining to perform a desiccation function at predetermined desiccation time intervals based at least in part on the crop data; and
  determining to perform an agitation function based at least in part on the double buoyancy system.

16. The device of claim 15, wherein performing the agitation function includes alternating airflow in and out of buoyancy chambers of the double buoyancy system to cause the cage type to rock back and forth.

17. The device of claim 15, wherein performing the agitation function further includes performing a cage roll function.

18. The device of claim 15, wherein before performing the desiccation function, the operations further comprise:
 determining, based at least in part on the sensor data, that at least one surface condition meets or exceeds a threshold;
 determining to wait for an additional wait time;
 determining, after the additional wait time has elapsed, that the at least one surface condition is below the threshold; and
 determining to initiate the desiccation function.

19. The device of claim 18, wherein the at least one surface condition includes a wave height, a wave frequency, a wind speed, or a temperature.

20. The device of claim 15, the operations further comprising:
- determining, in association with the desiccation function and based at least in part on the sensor data, that a surface condition indicates a surface temperature above a temperature threshold;
- determining that a minimum surface time has elapsed; and
- determining, based at least in part on the minimum surface time and the surface temperature, that the desiccation function is complete.

* * * * *